United States Patent
Lee

(10) Patent No.: US 11,941,195 B2
(45) Date of Patent: Mar. 26, 2024

(54) DISPLAY DEVICE

(71) Applicant: Samsung Display Co., LTD., Yongin-si (KR)

(72) Inventor: Soon Gyu Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/541,249

(22) Filed: Dec. 3, 2021

(65) Prior Publication Data

US 2022/0197421 A1 Jun. 23, 2022

(30) Foreign Application Priority Data

Dec. 4, 2020 (KR) .................. 10-2020-0168075

(51) Int. Cl.
 *G06F 3/041* (2006.01)
(52) U.S. Cl.
 CPC ........ *G06F 3/0412* (2013.01); *G06F 3/04166* (2019.05)
(58) Field of Classification Search
 CPC ..................................... G06F 21/32
 See application file for complete search history.

(56) References Cited

U.S. PATENT DOCUMENTS

| | | | |
|---|---|---|---|
| 10,048,787 B2 | 8/2018 | Erhart et al. | |
| 2018/0349667 A1* | 12/2018 | Kim | G09G 5/00 |
| 2019/0129559 A1* | 5/2019 | Adams | G06F 1/1626 |
| 2020/0327301 A1* | 10/2020 | Shih | G06V 40/13 |
| 2020/0342196 A1* | 10/2020 | Chang | G09G 3/3688 |
| 2021/0117522 A1* | 4/2021 | He | G06F 21/32 |

* cited by examiner

*Primary Examiner* — Robin J Mishler
(74) *Attorney, Agent, or Firm* — H.C. Park & Associates, PLC

(57) ABSTRACT

A display device includes: a display unit including pixels; a touch sensing unit disposed on the display unit and including touch electrodes; a fingerprint sensing unit including fingerprint sensors; a touch driver configured to drive the touch sensing unit to sense a touch of a touch input member; a fingerprint sensor driver configured to drive the fingerprint sensors to sense a fingerprint of a user in a first mode and to drive the fingerprint sensing unit in synchronization with the touch driver to sense a touch of the user in a second mode; and a main processor configured to perform a task based on sensing information of the fingerprint of the user received from the fingerprint sensor driver in the first mode and to perform a task based on sensing information of the touch input member and sensing information of the touch of the user in the second mode.

21 Claims, 19 Drawing Sheets

DISPLAY DEVICE

CROSS REFERENCE TO RELATED APPLICATION

This application claims priority from and the benefit of Korean Patent Application No. 10-2020-0168075 filed on Dec. 4, 2020, which is hereby incorporated by reference for all purposes as if fully set forth herein.

BACKGROUND

Field

Embodiments of the invention relate generally to a display device and more specifically, to a display device having a touch sensing unit and a fingerprint sensing unit.

Discussion of the Background

As the information society develops, the demand for display devices for displaying images has been increased in various forms. For example, the display devices have been applied to various electronic devices such as smartphones, digital cameras, notebook computers, navigation devices, and smart televisions. The display devices may include flat panel display devices such as liquid crystal display devices, field emission display devices, and organic light emitting display devices. In the flat panel display devices, a light emitting display device includes a light emitting element that enables each pixel of a display panel to emit light by itself. Thus, the light emitting display device can display an image without a backlight unit that provides light to the display panel.

A display device may include a display unit which displays an image, a touch sensing unit which recognizes or senses a touch input, and a fingerprint sensing unit which senses a fingerprint. The touch sensing unit nay determine whether a user's touch input has been made and calculate a corresponding position as touch input coordinates. The fingerprint sensing unit may recognize or sense a user's fingerprint.

The above information disclosed in this Background section is only for understanding of the background of the inventive concepts, and, therefore, it may contain information that does not constitute prior art.

SUMMARY

Display devices constructed according to the principles of the invention are capable of simultaneously recognizing or sensing a touch input member and a user's finger even when the display device is driven at a high-speed driving frequency by simultaneously driving a touch driver and a fingerprint sensor driver.

Additional features of the inventive concepts will be set forth in the description which follows, and in part will be apparent from the description, or may be learned by practice of the inventive concepts.

According to an aspect of the invention, a display device includes: a display unit including a plurality of pixels; a touch sensing unit disposed on the display unit and including a plurality of touch electrodes; a fingerprint sensing unit including a plurality of fingerprint sensors; a touch driver configured to drive the touch sensing unit to sense a touch of a touch input member; a fingerprint sensor driver configured to drive the fingerprint sensors to sense a fingerprint of a user in a first mode and configured to drive the fingerprint sensing unit in synchronization with the touch driver to sense a touch of the user in a second mode; and a main processor configured to perform a task based on sensing information of the fingerprint of the user received from the fingerprint sensor driver in the first mode and configured to perform a task based on sensing information of the touch input member received from the touch driver and sensing information of the touch of the user received from the fingerprint sensor driver in the second mode.

The display device may further include a display driver configured to drive the plurality of pixels based on information of the task performed by the main processor to display an image corresponding to the information of the task performed by the main processor, wherein: the sensing information of the touch input member may include coordinate information and identification information of the touch input member, and the sensing information of the touch of the user may include coordinate information of the touch of the user.

In the second mode, the main processor may be configured to perform a task corresponding to the sensing information of the touch input member received from the touch driver and a task corresponding to the sensing information of the touch of the user received from the fingerprint sensor driver during one display frame period of the display driver.

The display driver may be configured to drive the plurality of pixels at a first frequency, the fingerprint sensor driver may be configured to drive the fingerprint sensors at the first frequency or a second frequency different from the first frequency, and the touch driver may be configured to drive the touch electrodes at a third frequency different from the first frequency and the second frequency.

The third frequency may be an integer multiple of the second frequency.

The touch driver may be configured to drive the touch electrodes to receive the sensing information of the touch input member during a first touch frame period and to generate touch sensing data including the coordinate information and the identification information of the touch input member based on the sensing information of the touch input member during the first touch frame period during a second touch frame period immediately after the first touch frame period.

The touch driver may be configured to drive the touch electrodes to receive the sensing information of the touch input member during the second touch frame period and to generate touch sensing data including the coordinate information and the identification information of the touch input member based on the sensing information of the touch input member during the second touch frame period during a third touch frame period immediately after the second touch frame period.

In the second mode, the fingerprint sensor driver may be configured to receive the sensing information of the touch of the user during a first fingerprint frame period corresponding to at least one touch frame period and to generate touch sensing data including the coordinate information of the touch of the user based on the sensing information of the touch of the user.

In the second mode, the main processor may be configured to receive touch sensing data generated during a first fingerprint frame period of the fingerprint sensor driver to perform a task corresponding to the sensing information of the touch input member received from the touch driver and a task corresponding to the sensing information of the touch of the user received from the fingerprint sensor driver during a second fingerprint frame period immediately after the first fingerprint frame period.

The display driver may be configured to display an image corresponding to information of a task performed by the main processor during a display frame period immediately after the second fingerprint frame period.

In the second mode, the main processor may be configured to receive touch sensing data generated during the second fingerprint frame period of the fingerprint sensor driver to perform a task corresponding to the sensing information of the touch input member received from the touch driver and a task corresponding to the sensing information of the touch of the user received from the fingerprint sensor driver during a third fingerprint frame period immediately after the second fingerprint frame period.

The display driver may be configured to displays an image corresponding to information of a task performed by the main processor during a display frame period immediately after the third fingerprint frame period.

The touch driver may be configured to perform bi-directional communication with the touch input member to receive identification information or state information of the touch input member.

The fingerprint sensor driver may be configured to operate according to the first mode in a preset step including at least one of a locking step, an approval step and a user authentication step and operates according to the second mode in a step other than the first mode.

The fingerprint sensors may include at least one of an optical fingerprint sensor, an ultrasonic fingerprint sensor, and a capacitive fingerprint sensor.

According to another aspect of the invention, a display device includes: a display unit including a plurality of pixels; a touch sensing unit disposed on the display unit and comprising a plurality of touch electrodes; a fingerprint sensing unit including a plurality of fingerprint sensors; a touch driver configured to drive the touch sensing unit to sense a touch of a touch input member; a fingerprint sensor driver configured to drive the fingerprint sensing unit in synchronization with the touch driver to sense a touch of a user; a main processor configured to perform a task based on sensing information of the touch input member received from the touch driver and sensing information of the touch of the user received from the fingerprint sensor driver; and a display driver configured to drive the plurality of pixels based on information of the task performed by the main processor to display an image corresponding to the information of the task performed by the main processor.

The main processor may be configured to perform a task corresponding to the sensing information of the touch input member received from the touch driver and a task corresponding to the sensing information of the touch of the user received from the fingerprint sensor driver during one display frame period of the display driver, and wherein: the sensing information of the touch input member may include coordinate information and identification information of the touch input member, and the sensing information of the touch of the user may include coordinate information of the touch of the user.

The main processor may be configured to receive the sensing information of the touch of the user sensed during a first fingerprint frame period of the fingerprint sensor driver and the sensing information of the touch input member sensed during at least one consecutive touch frame period of the touch driver to perform a task corresponding to the sensing information of the touch input member received from the touch driver and a task corresponding to the sensing information of the touch of the user received from the fingerprint sensor driver during a second fingerprint frame period immediately after the first fingerprint frame period, and wherein: the sensing information of the touch input member may include coordinate information and identification information of the touch input member, and the sensing information of the touch of the user may include coordinate information of the touch of the user.

The display driver may be configured to display an image corresponding to information of a task performed by the main processor during a display frame period immediately after the second fingerprint frame period.

The main processor may be configured to receive the coordinate information of the touch of the user sensed during the second fingerprint frame period of the fingerprint sensor driver to perform a task corresponding to the sensing information of the of the touch input member received from the touch driver and a task corresponding to the sensing information of the touch of the user received from the fingerprint sensor driver during a third fingerprint frame period immediately after the second fingerprint frame period.

The display driver may be configured to display an image corresponding to information of the task performed by the main processor during a display frame period immediately after the third fingerprint frame period.

According to another aspect of the invention, a display device includes: a display unit including a plurality of pixels; a fingerprint sensing unit disposed on a surface of the display unit and including a plurality of fingerprint sensors; an electromagnetic sensing unit disposed on a surface of the fingerprint sensing unit and including a plurality of electrode patterns; an electromagnetic sensor driver configured to drive the electrode patterns to sense a touch of a touch input member; a fingerprint sensor driver configured to drive the fingerprint sensors to sense a fingerprint of a user in a first mode and configured to drive the fingerprint sensing unit in synchronization with the electromagnetic sensor driver to sense the touch of the user in a second mode; and a main processor configured to perform a task based on sensing information of the fingerprint received from the fingerprint sensor driver in the first mode and configured to perform a task based on sensing information of the touch input member received from the electromagnetic sensor driver and sensing information of the touch of the user received from the fingerprint sensor driver in the second mode.

The display device may further include a display driver configured to drive the plurality of pixels based on information of a task performed by the main processor to display an image corresponding to the information of the task performed by the main processor, wherein in the second mode, the main processor may be configured to perform a task corresponding to the sensing information of the touch input member received from the electromagnetic sensor driver and a task corresponding to the sensing information of the touch of the user received from the fingerprint sensor driver during one display frame period of the display driver, wherein: the sensing information of the touch input member may include coordinate information and identification information of the touch input member, and the sensing information of the touch of the user may include coordinate information of the touch of the user.

In the second mode, the main processor may be configured to receive touch sensing data generated during a first fingerprint frame period of the fingerprint sensor driver to perform a task corresponding to the sensing information of the touch input member received from the electromagnetic sensor driver and a task corresponding to the sensing information of the touch of the user received from the fingerprint sensor driver during a second fingerprint frame period immediately after the first fingerprint frame period.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
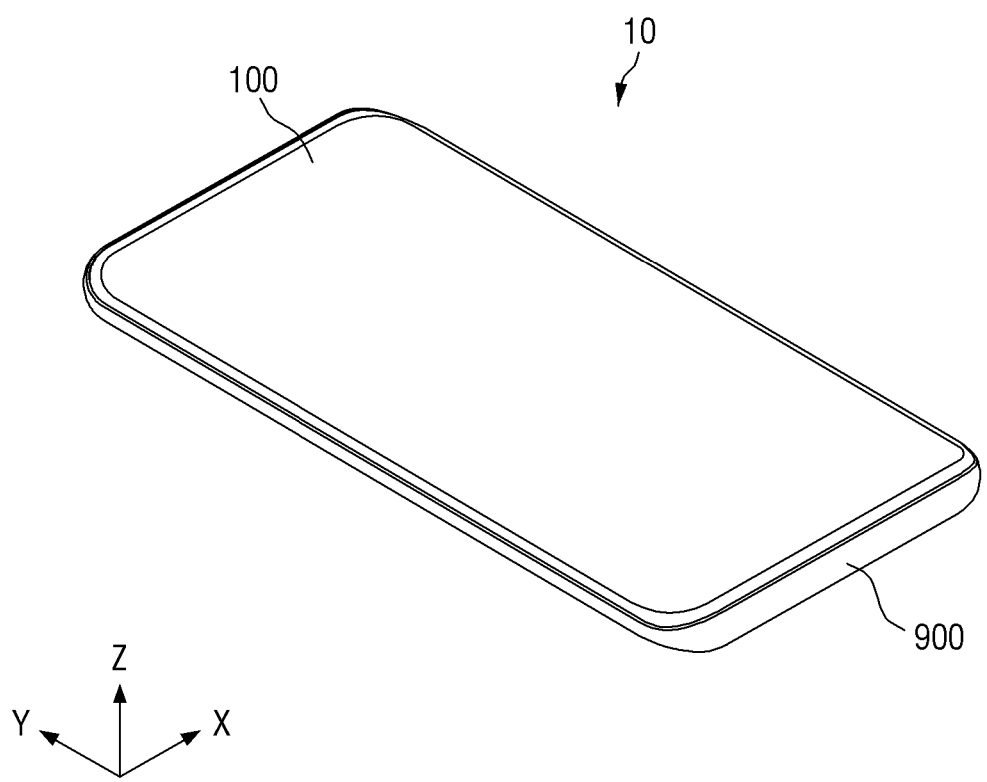
FIG. 1 is a perspective view of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
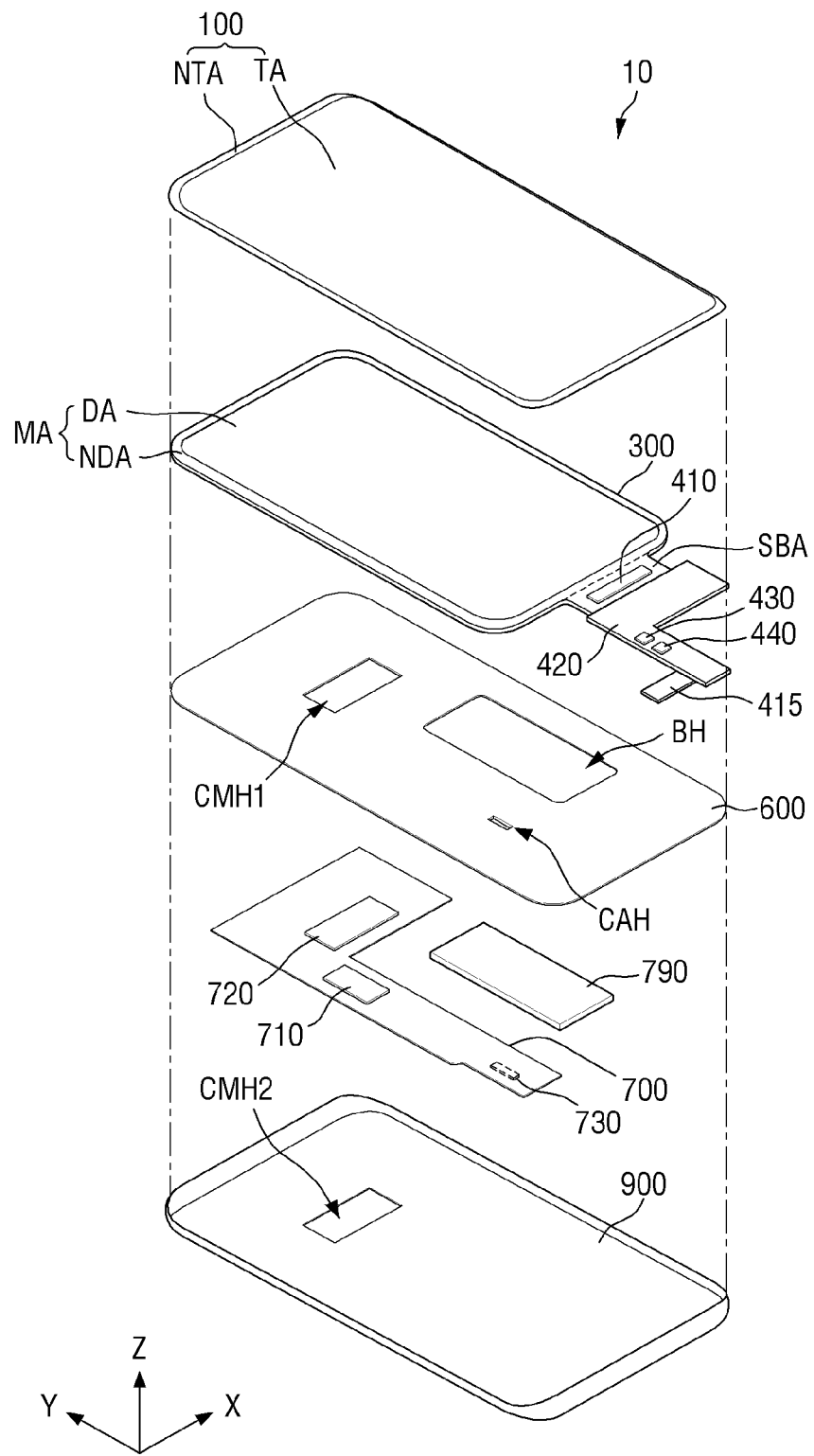
FIG. 2 is an exploded perspective view of the display device of FIG. 1.
Figure 3:
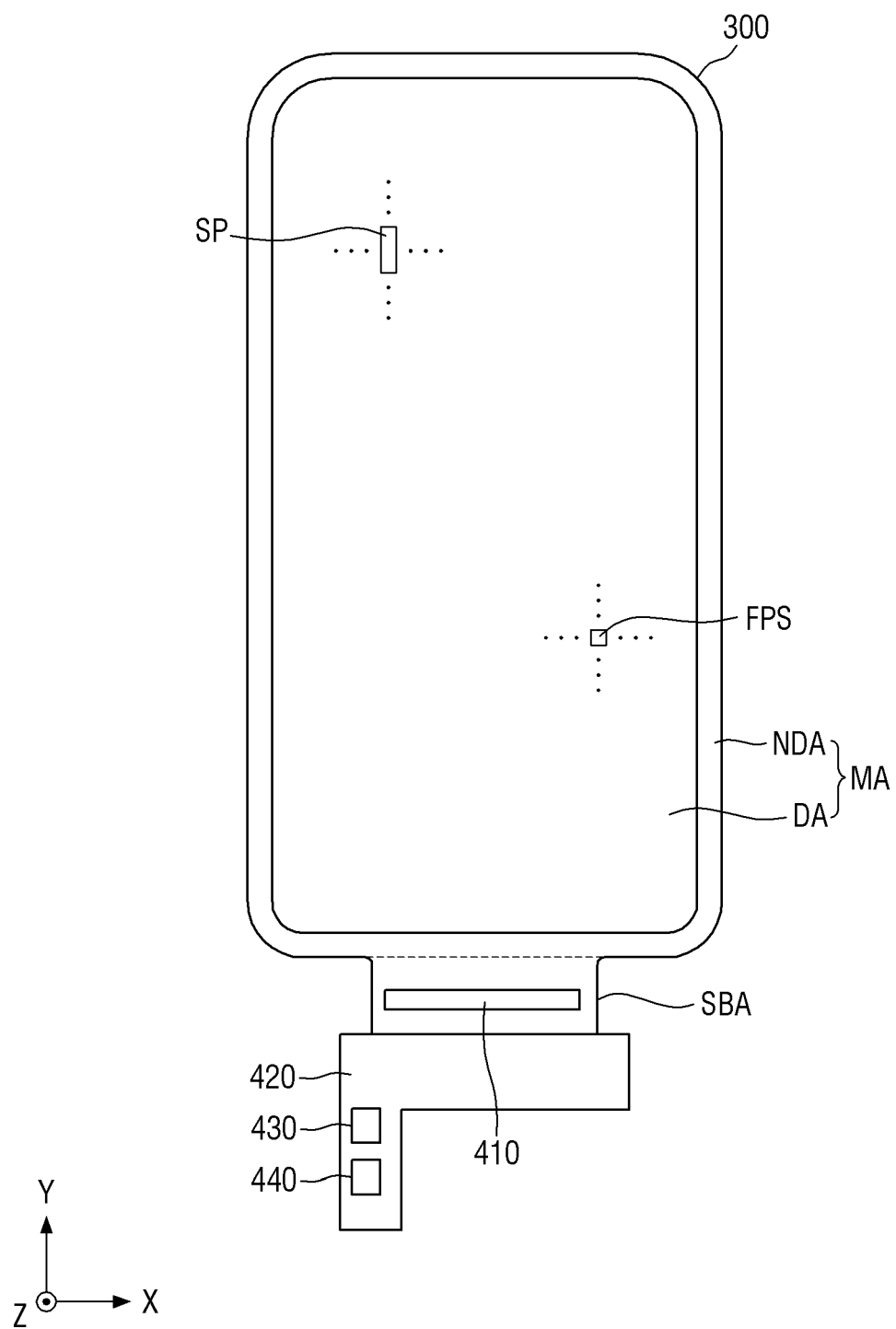
FIG. 3 is a plan view of a display panel of the display device of FIG. 1.

FIG. 1 is a perspective view of a display device 10 according to an embodiment. FIG. 2 is an exploded perspective view of the display device 10 according to the embodiment. FIG. 3 is a plan view of a display panel 300 of the display device 10 according to the embodiment.

Referring to FIGS. 1, 2, and 3, the display device 10 includes a cover window 100, the display panel 300, a bracket 600, a main circuit board 700, and a bottom cover 900.

In the description of the descriptions, "above," "top," and "upper surface" refer to an upward direction from the display device 10, e.g., a Z-axis direction, and "under," "bottom," and "lower surface" refer to a downward direction from the display device 10, e.g., a direction opposite to the Z-axis direction. In addition, "left," "right," "upper," and "lower" refer to directions when the display device 10 is viewed in a plane. For example, "left" refers to a direction opposite to an X-axis direction, "right" refers to the X-axis direction, "upper" refers to a Y-axis direction, and "lower" refers to a direction opposite to the Y-axis direction.

The display device 10 is a device for displaying moving images or still images. The display device 10 may be used as a display screen in portable electronic devices such as mobile phones, smartphones, tablet personal computers (PCs), smart watches, watch phones, mobile communication terminals, electronic notebooks, electronic books, portable multimedia players (PMPs), navigation devices and ultra-mobile PCs (UMPCs), as well as in various products such as televisions, notebook computers, monitors, billboards and the Internet of things (IoT).

The display device 10 may be rectangular in plan view. For example, the display device 10 may have a rectangular planar shape having short sides in a first direction (e.g., X-axis direction) and long sides in a second direction (e.g., Y-axis direction). Each corner where a short side extending in the first direction (e.g., X-axis direction) meets a long side extending in the second direction (e.g., Y-axis direction) may be rounded with a predetermined curvature or may be right-angled. However, embodiments are not limited thereto. For example, the display device 10 may have another polygonal shape, a circular shape, or an oval shape.

The cover window 100 may be disposed on the display panel 300 to cover an upper surface of the display panel 300. The cover window 100 may protect the upper surface of the display panel 300.

The cover window 100 may include a transmissive area TA overlapping a display area DA of the display panel 300 and a non-transmissive area NTA overlapping a non-display area NDA of the display panel 300. For example, the non-transmissive area NTA may be formed to be opaque. For another example, the non-transmissive area NTA may be formed as a decorative layer having a pattern that may be shown to a user when an image is not displayed.

The display panel 300 may be disposed under the cover window 100. Therefore, an image displayed by the display panel 300 can be viewed on an upper surface of the display device 10 through the cover window 100.

The display panel 300 may include a main area MA and a sub area SBA.

The main area MA may include the display area DA including a plurality of pixels SP for displaying an image and the non-display area NDA disposed around the display area DA. The pixels SP may include first, second, and third subpixels. For example, the first subpixels may emit red light, the second subpixels may emit green light, and the third subpixels may emit blue light. Respective emission areas or opening areas of the first, second, and third subpixels may have different sizes, but embodiments are not limited thereto.

The display area DA may emit light from a plurality of emission areas or a plurality of opening areas. For example, the display panel 300 may include pixel circuits including switching elements, a pixel defining layer defining the emission areas or the opening areas, and self-light emitting elements.

For example, the self-light emitting elements may include at least one of an organic light emitting diode including an organic light emitting layer, a quantum dot light emitting diode including a quantum dot light emitting layer, and an inorganic light emitting diode including an inorganic semiconductor. However, embodiments are not limited thereto.

For example, the display panel 300 may include a touch sensing unit which can sense a touch of a user's finger or a touch input device such as a pen. The touch sensing unit may include a plurality of touch electrodes and may be disposed on a display layer in which the pixels SP are disposed.

The display area DA may include a plurality of fingerprint sensors FPS to recognize or sense a user's fingerprint. For example, the pixels SP and the fingerprint sensors FPS may be disposed on the same layer of the display panel 300. For another example, the pixels SP and the fingerprint sensors FPS may be disposed on different layers of the display panel 300. The display area DA may display an image, may recognize or sense a touch of a user or a touch input device, or may be used as an area for recognizing or sensing a user's fingerprint. For example, the fingerprint sensors FPS may be disposed in the entire display area DA. For another example, the fingerprint sensors FPS may be disposed in a specific area of the display area DA.

The non-display area NDA may be an area outside the display area DA, The non-display area NDA may be defined as an edge area of the main area MDA of the display panel 300. The non-display area NDA may include a scan driver which supplies gate signals to scan lines and fan-out lines which connect a display driver 410 and the display area DA.

The sub area SBA may extend from a side of the main area MA, The sub area SBA may include a flexible material that can be bent, folded, rolled, etc. For example, when the sub area SBA is bent, the sub area SBA may be overlapped by the main area MA in a thickness direction (e.g., Z-axis direction). The sub area SBA may include the display driver 410 and a pad unit connected to a circuit board 420.

The display device 10 may further include the display driver 410, the circuit board 420, a touch driver 430, and a fingerprint sensor driver 440.

The display driver 410 may be disposed in the sub area SBA of the display panel 300. The display driver 410 may output signals and voltages for driving the display panel 300. For example, the display driver 410 may supply data voltages to data lines, and the data voltages may be supplied to the pixels SP through the data lines. The display driver 410 may supply a driving voltage or a power supply voltage to a power supply line.

The circuit board 420 may be attached onto the pad unit disposed in the sub area SBA of the display panel 300. For example, the circuit board 420 may be attached onto the pad unit of the sub area SBA of the display panel 300 by using a low-resistance, high-reliability material such as an anisotropic conductive film (ACF) or a self assembly anisotropic conductive paste (SAP). Lead lines of the circuit board 420 may be electrically connected to the pad unit of the display panel 300. For example, the circuit board 420 may be a flexible printed circuit board (FPCB), a printed circuit board (PCB), or a flexible film such as a chip-on film (COF).

The touch driver 430 may be disposed on the circuit board 420 to measure capacitance of the touch electrodes. For example, the touch driver 430 may determine the occurrence of a user's touch and touch coordinates based on a change in mutual capacitance or self-capacitance of the touch electrodes. Here, the user's touch may include a case that a touch input member such as a pen or a user's body part such as a finger directly touches a surface of the display device 10 which is disposed on the touch sensing unit. The touch driver 430 may determine the touch coordinates by discriminating or determining between a part where a user's touch has occurred and a part where the user's touch has not occurred among the touch electrodes. For example, the touch driver 430 may be driven in synchronization with the display driver 410, but embodiments are not limited thereto.

The fingerprint sensor driver 440 may be disposed on the circuit board 420 and connected to the fingerprint sensors FPS through read-out lines. The fingerprint sensors FPS may include at least one of an optical fingerprint sensor, an ultrasonic fingerprint sensor, and a capacitive fingerprint sensor. The fingerprint sensor driver 440 may receive sensing signals sensed by the fingerprint sensors FPS through the read-out lines. Ina first mode, the fingerprint sensor driver 440 may convert a sensing signal into fingerprint sensing data in digital data and transmit the fingerprint sensing data to a main processor 710. In a second mode, the fingerprint sensor driver 440 may convert a sensing signal into touch sensing data and transmit the touch sensing data to the main processor 710. Here, the fingerprint sensor driver 440 may operate according to the first mode in a preset step including at least one of a locking step, an approval step, and a user authenticating step, but example steps of the first mode are not limited thereto. The fingerprint sensor driver 440 may operate according to the second mode in a step other than the first mode. For example, the fingerprint sensor driver 440 may be driven in synchronization with the display driver 410 and the touch driver 430, but embodiments are not limited thereto.

The bracket 600 may be disposed under the display panel 300. The bracket 600 may be made of plastic, metal, or a combination of the same. For example, the bracket 600 may include a first camera hole CMH1 into which a first camera sensor 720 is inserted, a battery hole BH in which a battery is disposed, and a cable hole CAB through which a cable 415 connected to the display driver 410 or the circuit board 420 passes.

The main circuit board 700 and a battery 790 may be disposed under the bracket 600. The main circuit board 700 may be a printed circuit board (PCB) or a flexible printed circuit board (FPCB).

The main circuit board 700 may include the main processor 710, the first camera sensor 720, and a main connector 730. The main processor 710 may be disposed on an upper surface of the main circuit board 700, the first camera sensor 720 may be disposed on both the upper surface and a lower surface of the main circuit board 700, and the main connector 730 may be disposed on the lower surface of the main circuit board 700.

The main processor 710 may control all functions of the display device 10. For example, the main processor 710 may supply digital video data to the display driver 410 so that the display panel 300 displays an image. The main processor 710 may receive touch sensing data including coordinate information of a touch input member from the touch driver 430 and execute a task or application indicated by an icon displayed at the touch coordinates of the touch input member.

In the first mode, the main processor 710 may generate a fingerprint image by receiving fingerprint sensing data from the fingerprint sensor driver 440 and recognize or sense a user's fingerprint pattern. Therefore, the main processor 710 may perform authentication according to the user's fingerprint or execute a task or an application in the first mode.

In the second mode, the main processor 710 may receive touch sensing data including coordinate information of a finger from the fingerprint sensor driver 440 and execute a task or application indicated by an icon displayed at touch coordinates of the finger.

Therefore, the main processor 710 may simultaneously drive the touch driver 430 and the fingerprint sensor driver 440 in the second mode. The main processor 710 may receive touch sensing data from each of the touch driver 430 and the fingerprint sensor driver 440 and simultaneously process the touch sensing data of the touch driver 430 and the touch sensing data of the fingerprint sensor driver 440 during one display frame period or one fingerprint frame period. For example, when a touch input member and a user's finger touch a plurality of points on the display device 10, the main processor 710 may simultaneously drive the touch driver 430 and the fingerprint sensor driver 440 to execute a task or application indicated by an icon displayed at touch coordinates of each of the touch input member and the user's finger. Since the display device 10 simultaneously drives the touch driver 430 and the fingerprint sensor driver 440 in the second mode, even when the display device 10 is driven at a high-speed driving frequency, the touch input member and the user's finger can be simultaneously recognized or sensed, and the touch sensitivity and touch reliability of the display device 10 can be improved or enhanced.

The first camera sensor 720 may process an image frame such as a still image or a moving image obtained or sensed by an image sensor and output the processed image frame to the main processor 710. For example, the first camera sensor 720 may be a complementary metal-oxide-semiconductor (CMOS) image sensor or a charge-coupled device (CCD) sensor. The first camera sensor 720 may be exposed on a lower surface of the bottom cover 900 by a second camera hole CMH2 and may photograph an object or background disposed under the display device 10. However, embodiments are not limited thereto.

The main connector 730 may be connected to the cable 415 passing through the cable hole CAH of the bracket 600. Therefore, the main circuit board 700 may be electrically connected to the display driver 410 or the circuit board 420.

The battery 790 may be disposed not to overlap the main circuit board 700 in the thickness direction (e.g., Z-axis direction). The battery 790 may overlap the battery hole BH of the bracket 600.

The bottom cover 900 may be disposed under the main circuit board 700 and the battery 790. The bottom cover 900 may be fastened and fixed to the bracket 600. The bottom cover 900 may form the bottom exterior of the display device 10.

The bottom cover 900 may include the second camera hole CMH2 through which a lower surface of the first camera sensor 720 is exposed. The position of the first camera sensor 720 and the positions of the first and second camera holes CMH1 and CMH2 corresponding to the first camera sensor 720 are not limited to the embodiment illustrated in FIG. 2.

Figure 4:
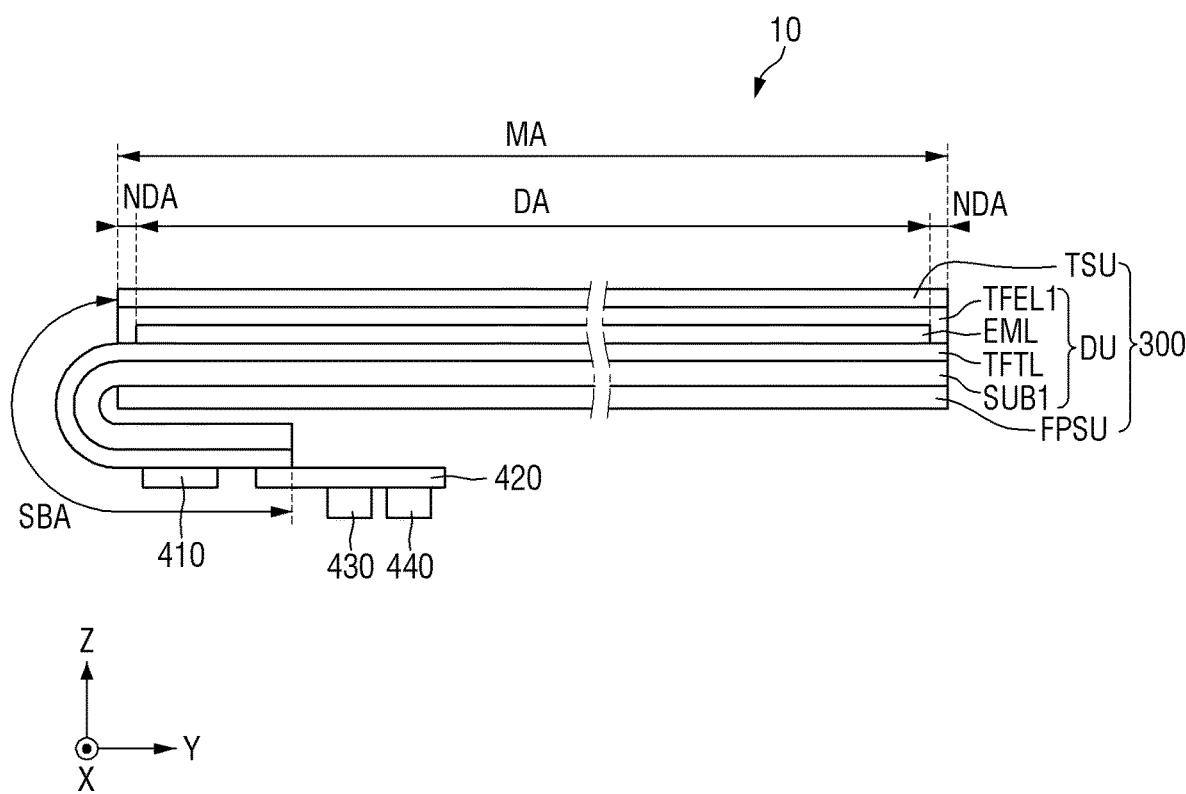
FIG. 4 is a cross-sectional view of an embodiment of the display panel of the display device of FIG. 1.

FIG. 4 is a cross-sectional view of the display panel 300 of the display device 10 according to the embodiment.

Referring to FIG. 4, the display panel 300 may include a display unit DU, a touch sensing unit TSU, and a fingerprint sensing unit FPSU. The display unit DU may include a first substrate SUB1, a thin-film transistor layer TFTL, a light emitting element layer EML, and a first encapsulation layer TFEL1.

The first substrate SUB1 may be a base substrate or a base member and may be made of an insulating material such as polymer resin. For example, the first substrate SUB1 may be a flexible substrate that can be bent, folded, rolled, etc. When the first substrate SUB1 is a flexible substrate, the first substrate SUB1 may be made of polyimide (PI). However, embodiments are not limited thereto.

The thin-film transistor layer TFTL may be disposed on the first substrate SUB1. The thin-film transistor layer TFTL may include a plurality of thin-film transistors constituting a pixel circuit of a plurality of pixels SP. The thin-film transistor layer TFTL may include a plurality of gate lines, a plurality of data lines, a plurality of power supply lines, a plurality of gate control lines, a plurality of fan-out lines connecting the display driver 410 and the data lines, and a plurality of pad connection lines connecting the display driver 410 and the pad unit. Each of the thin-film transistors may include a semiconductor region, a source electrode, a drain electrode, and a gate electrode. For example, when a gate driver is disposed on a side of the non-display area NDA of the display panel 300, the gate driver may include a plurality of thin-film transistors.

The thin-film transistor layer TFTL may be disposed in the display area DA and the non-display area NDA. The thin-film transistors of each of the pixels SP of the thin-film transistor layer TFTL, the gate lines, the data lines, and the power supply lines may be disposed in the display area DA. The gate control lines, the fan-out lines, and the pad connection lines of the thin-film transistor layer TFTL may be disposed in the non-display area NDA.

The light emitting element layer EML may be disposed on the thin-film transistor layer TFTL. The light emitting element layer EML may include a plurality of light emitting elements, each light emitting element including a first electrode, a light emitting layer, and a second electrode sequentially stacked to emit light, and the pixel defining layer defining the pixels SP. The light emitting elements of the light emitting element layer EML may be disposed in the display area DA.

For example, the light emitting layer of each light emitting element may be an organic light emitting layer including an organic material. The light emitting layer may include a hole transporting layer, an organic light emitting layer, and an electron transporting layer. When the first electrode receives a predetermined voltage through a thin-film transistor of the thin-film transistor layer TFTL and the second electrode receives a cathode voltage, holes and electrons may move to the organic light emitting layer through the hole transporting layer and the electron transporting layer, respectively, and may combine together in the organic light emitting layer to emit light. For example, the first electrode may be an anode, and the second electrode may be a cathode.

For another example, the light emitting element layer EML may include a quantum dot light emitting diode including a quantum dot light emitting layer or an inorganic light emitting diode including an inorganic semiconductor.

The first encapsulation layer TFEL1 may cover upper and side surfaces of the light emitting element layer EML and may protect the light emitting element layer EML. The first encapsulation layer TFEL1 may include at least one inorganic layer and at least one organic layer to encapsulate the light emitting element layer EML.

The touch sensing unit TSU may be disposed on the first encapsulation layer TFEL1. The touch sensing unit TSU may include a plurality of touch electrodes for sensing a user's touch in a capacitive manner and touch lines connecting the touch electrodes and the touch driver 430. For example, the touch sensing unit TSU may sense a touch of a touch input member or a user in a mutual capacitance manner or in a self-capacitance manner.

For another example, the touch sensing unit TSU may be disposed on a separate substrate disposed on the display unit DU. In this case, the substrate supporting the touch sensing unit TSU may be a base member that encapsulates the display unit DU.

For another example, the touch sensing unit TSU may be disposed on the same layer as the first encapsulation layer TFEL1 or may be disposed under the first encapsulation layer TFEL1.

The touch electrodes of the touch sensing unit TSU may be disposed in a touch sensor area overlapping the display area DA. The touch lines of the touch sensing unit TSU may be disposed in a touch peripheral area overlapping the non-display area NDA.

The fingerprint sensing unit FPSU may be disposed under the display unit DU. For example, the display unit DU may be disposed between the touch sensing unit TSU and the fingerprint sensing unit FPSU. For example, the fingerprint sensing unit FPSU may be attached to the bottom of the first substrate SUB1 through an adhesive member. The adhesive member may be an optical clear adhesive. However, embodiments are not limited thereto.

The fingerprint sensing unit FPSU may include a plurality of fingerprint sensors FPS, and the fingerprint sensors FPS may be connected to the fingerprint sensor driver 440. The fingerprint sensors FPS may include at least one of an optical fingerprint sensor, an ultrasonic fingerprint sensor, and a capacitive fingerprint sensor. For example, the optical fingerprint sensor may include a photodiode, a phototransistor, a CMOS image sensor, or a CCD camera. However, embodiments are not limited thereto. The optical fingerprint sensor may recognize or sense a fingerprint by sensing light reflected by ridges of a finger and a valley between the ridges.

For another example, the fingerprint sensing unit FPSU may be disposed on the touch sensing unit TSU, may be disposed on the same layer as the touch sensing unit TSU, or may be disposed between the touch sensing unit TSU and the display unit DU. Therefore, the position of the fingerprint sensing unit FPSU is not limited to the embodiment illustrated in FIG. 4.

For example, a polarizing film may be additionally disposed between the cover window 100 and the touch sensing unit TSU. The polarizing film may be disposed on the touch sensing unit TSU, and the cover window 100 may be disposed on the polarizing film by an adhesive member.

The sub area SBA of the display panel 300 may extend from a side of the main area MA. The sub area SBA may include a flexible material that can be bent, folded, rolled, etc. For example, when the sub area SBA is bent, the sub area SBA may be overlapped by the main area MA in the thickness direction (e.g., Z-axis direction). The sub area SBA may include the display driver 410 and the pad unit connected to the circuit board 420. The circuit board 420 may be attached onto the pad unit, and the touch driver 430 and the fingerprint sensor driver 440 may be mounted on the circuit board 420.

Figure 5:
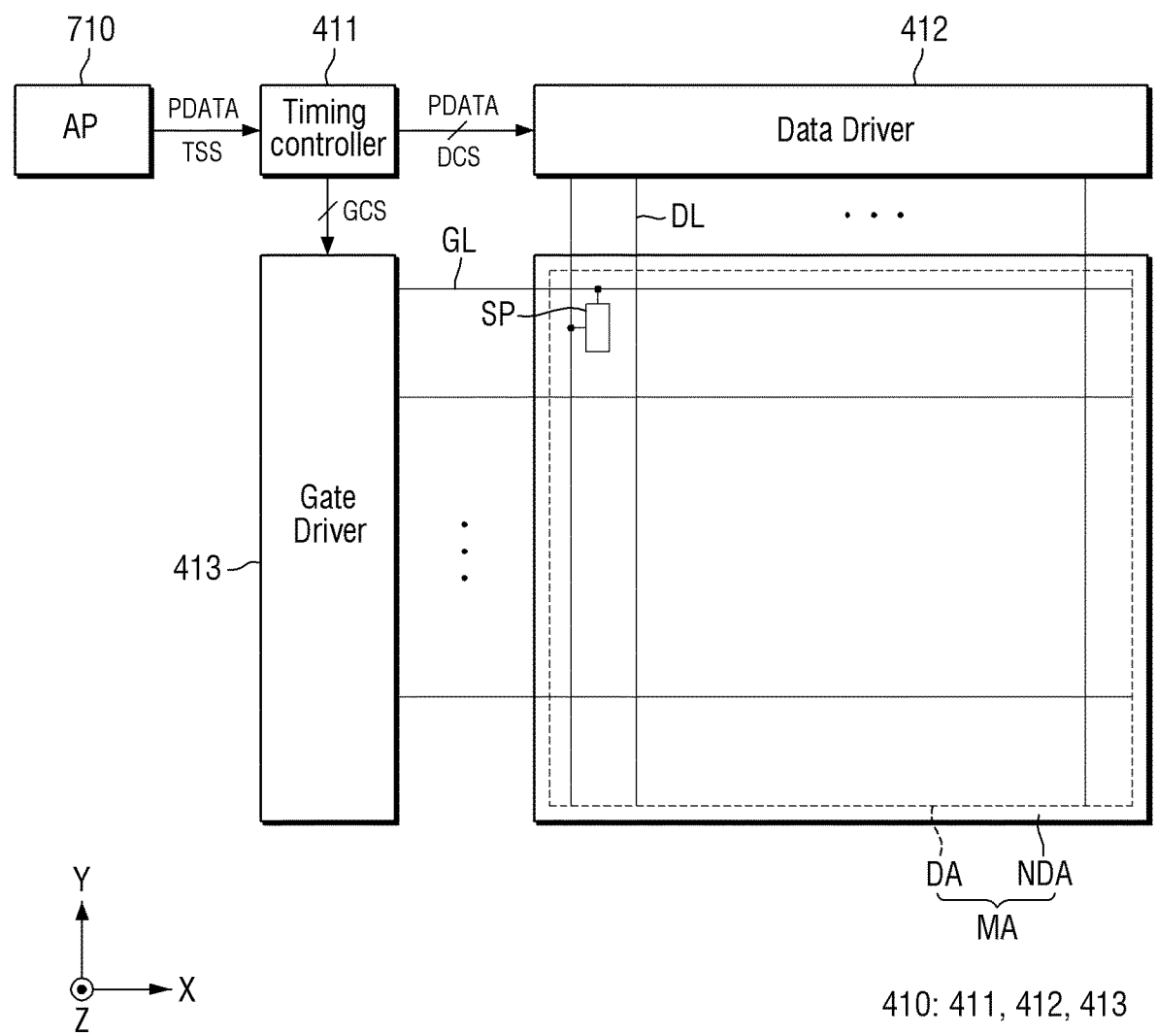
FIG. 5 is a block diagram illustrating a main area, a display driver, and a main processor of the display device of FIG. 1.

FIG. 5 is a block diagram illustrating the main area MA, the display driver 410, and the main processor 710 of the display device 10 according to the embodiment.

Referring to FIG. 5, the main area MA of the display panel 300 may include the display area DA and the non-display area NDA.

The display area DA is an area for displaying an image and may be defined as a central area of the display panel 300. The display area DA may include a plurality of pixels SP respectively formed in pixel areas electrically connected to a plurality of data lines DL and a plurality of gate lines GL. Each of the pixels SP may be connected to at least one gate line GL, a data line DL, and at least one power supply line. Each of the pixels SP may be defined as a minimum unit of area that outputs light.

The non-display area NDA may surround the display area DA. For example, the non-display area NDA may include a gate driver 413 which transmits gate signals to the gate lines GL, the fan-out lines which connect the data lines DL and a data driver 412, and the pad unit which is connected to the circuit board 420.

The display driver 410 may include a timing controller 411, the data driver 412, and the gate driver 413. For example, the gate driver 413 may be formed as a separate chip from the timing controller 411 and the data driver 412 and disposed on a side of the non-display area NDA, but embodiments are not limited thereto.

The timing controller 411 may receive pixel data PDATA and a timing synchronization signal TSS from the main processor 710 through a user connector provided on the circuit board 420. The timing controller 411 may generate a data control signal DCS and a gate control signal GCS based on the timing synchronization signal TSS. The timing controller 411 may control the driving timing of the data driver 412 using the data control signal DCS and may control the driving timing of the gate driver 413 using the gate control signal GCS.

The data driver 412 may be connected to the data lines DL. The data driver 412 may receive the pixel data PDATA and the data control signal DCS from the timing controller 411. The data driver 412 may generate data voltages based on the pixel data PDATA and supply the data voltages to the data lines DL according to the data control signal DCS. The data voltages may be supplied to the pixels SP through the data lines DL and may determine luminance of each of the pixels SP.

The gate driver 413 may be provided in the non-display area NDA of the display panel 300. For example, the gate driver 413 may be provided on a side of the non-display area NDA of the display panel 300. For another example, the gate driver 413 may be provided on both sides or left and right sides of the non-display area NDA. The gate driver 413 may generate gate signals according to the gate control signal GCS received from the timing controller 411 and may sequentially supply the gate signals to the gate lines GL according to a set order.

The main processor 710 may supply the pixel data PDATA and the timing synchronization signal TSS to the timing controller 411 so that the display panel 300 displays an image. For example, in the first mode, the main processor 710 may supply the pixel data PDATA, which reflects or includes authentication, task, or application execution according to a user's fingerprint based on fingerprint sensing data of the fingerprint sensor driver 440, to the display driver 410. In the second mode, the main processor 710 may supply the pixel data PDATA, which reflects or includes execution of a task or application based on touch sensing data of each of the touch driver 430 and the fingerprint sensor driver 440, to the display driver 410.

Figure 6:
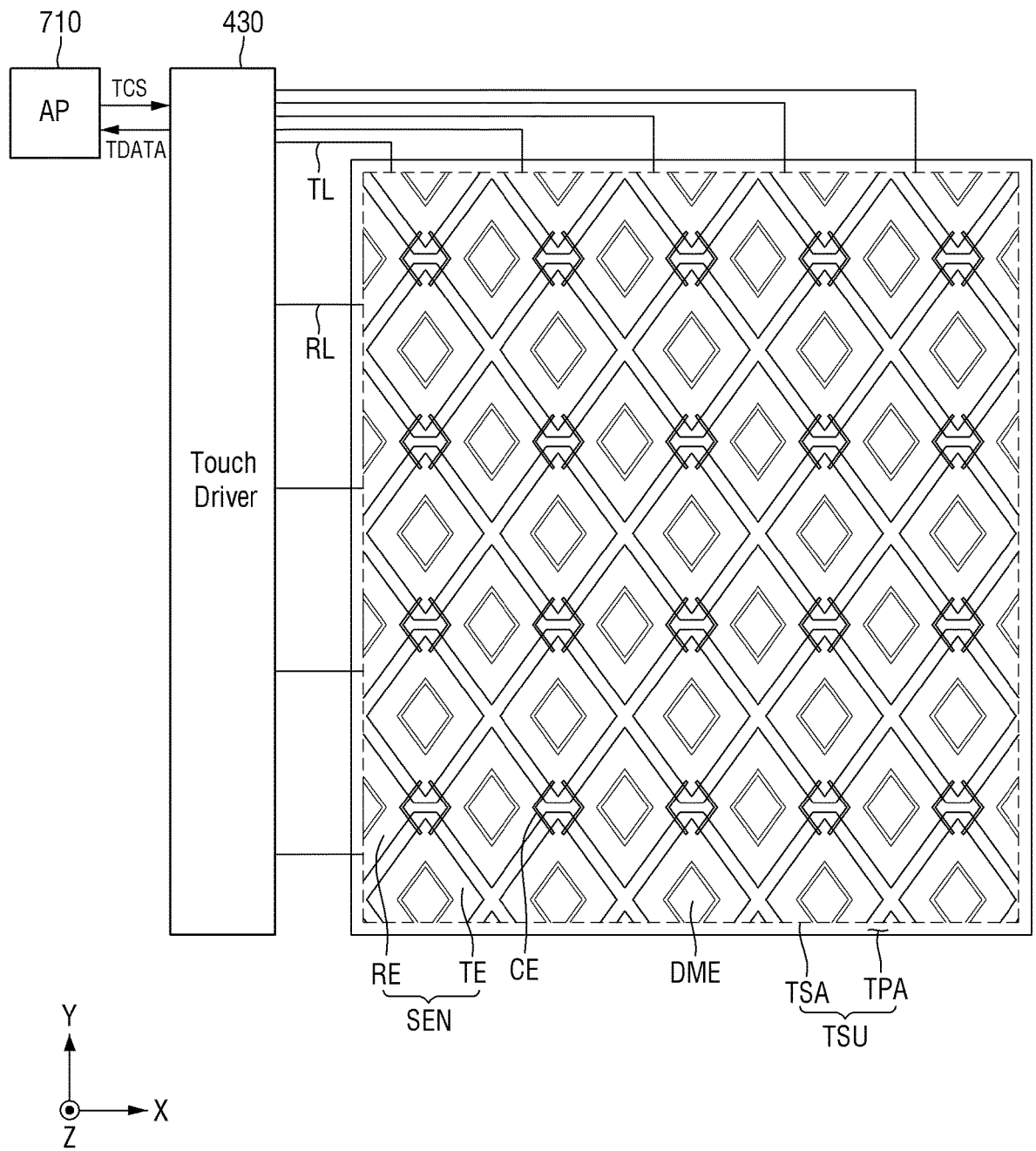
FIG. 6 is a block diagram illustrating a touch sensing unit, a touch driver, and the main processor of the display device of FIG. 1.

FIG. 6 is a block diagram illustrating the touch sensing unit TSU, the touch driver 430, and the main processor 710 of the display device 10 according to the embodiment.

Referring to FIG. 6, the touch sensing unit TSU may include a plurality of touch electrodes SEN. The touch electrodes SEN may include a plurality of touch driving electrodes TE and a plurality of touch sensing electrodes RE.

The touch driving electrodes TE may be arranged in the first direction (e.g., X-axis direction) and the second direction (e.g., Y-axis direction). The touch driving electrodes TE may be spaced apart from each other in the first direction (e.g., X-axis direction) and the second direction (e.g., Y-axis direction). The touch driving electrodes TE adjacent to each other in the second direction (e.g., Y-axis direction) may be electrically connected through a bridge electrode CE.

The bridge electrode CE may be disposed on a different layer from a layer, on which the touch driving electrodes TE and the touch sensing electrodes RE are disposed. The touch sensing electrodes RE adjacent to each other in the first direction (e.g., X-axis direction) may be electrically connected through a connection part disposed on the same layer, on which the touch sensing electrodes RE is disposed. The touch driving electrodes TE adjacent to each other in the second direction (e.g., Y-axis direction) may be electrically connected through the bridge electrode CE disposed on a different layer from a layer, on which the touch driving electrodes TE is disposed. Therefore, even if the bridge electrode CE overlaps the touch sensing electrodes RE in the thickness direction (e.g., Z-axis direction), the touch driving electrodes TE and the touch sensing electrodes RE may be insulated from each other.

The touch sensing electrodes RE may extend in the first direction (e.g., X-axis direction) and may be spaced apart from each other in the second direction (e.g., Y-axis direction). The touch sensing electrodes RE may be arranged in the first direction (e.g., X-axis direction) and the second direction (e.g., Y-axis direction), and the touch sensing electrodes RE adjacent to each other in the first direction (e.g., X-axis direction) may be electrically connected through a connection part.

Mutual capacitance may be formed between the touch driving electrodes TE and the touch sensing electrodes RE. Self-capacitance may be formed between each of the touch driving electrodes TE and the touch sensing electrodes RE and a touch input member.

Each of a plurality of dummy electrodes DME may be surrounded by a touch driving electrode TE or a touch sensing electrode RE. Each of the dummy electrodes DME may be spaced apart and insulated from the touch driving electrode TE or the touch sensing electrode RE. Therefore, the dummy electrodes DME may be electrically floating.

The touch driver 430 may be connected to the touch driving electrodes TE through touch driving lines TL. The touch driver 430 may supply touch driving signals to the touch driving electrodes TE through the touch driving lines TL. Each of the touch driving signals may be a signal having a plurality of driving pulses. The touch driver 430 may supply the touch driving signals to the touch driving lines TL based on a preset order. For example, the touch driver 430 may sequentially output the touch driving signals from the touch driving electrodes TE disposed on a side of a touch sensing area TSA to the touch driving electrodes TE disposed on the other side of the touch sensor area TSA.

The touch driver 430 may be connected to the touch sensing electrodes RE through touch sensing lines RL. The touch driver 430 may sense a change in mutual capacitance between the touch driving electrodes TE and the touch sensing electrodes RE through the touch sensing lines RL.

For another example, the touch driver 430 may supply the touch driving signals to the touch driving electrodes TE and the touch sensing electrodes RE. In this case, the touch driver 430 may sense a change in charge of each of the touch driving electrodes TE and sense a change in charge of each of the touch sensing electrodes RE. Therefore, the touch driver 430 may sense a change in self-capacitance formed between the touch driving electrodes TE and the touch sensing electrodes RE.

The touch driver 430 may generate touch sensing data TDATA based on a change in mutual capacitance or a change in self-capacitance and supply the touch sensing data TDATA to the main processor 710. For example, the touch driver 430 may receive a touch sensing signal from a touch driving electrode TE or a touch sensing electrode RE and generate the touch sensing data TDATA by converting the touch sensing signal into digital data. The touch driver 430 may calculate the occurrence of a touch input of a touch input member and touch coordinates of the touch input member by analyzing the touch sensing data TDATA.

The touch input member may be an electronic pen such as a stylus pen. The touch driver 430 may receive identification information or state information of the touch input member by performing bi-directional communication with the touch input member. For example, the identification information of the touch input member may include a user's ID or personal information. Although the touch sensing unit TSU has been described as a capacitive type, embodiments are not limited thereto, and the touch sensing unit TSU may also include another structure that can recognize or sense an input member.

The main processor 710 may supply a touch control signal TCS to the touch driver 430. The main processor 710 may control the driving timing of the touch driver 430 using the touch control signal TCS. The main processor 710 may receive the touch sensing data TDATA including coordinate information of the touch input member and may execute a task or application indicated by an icon displayed at touch coordinates of the touch input member.

Figure 7:
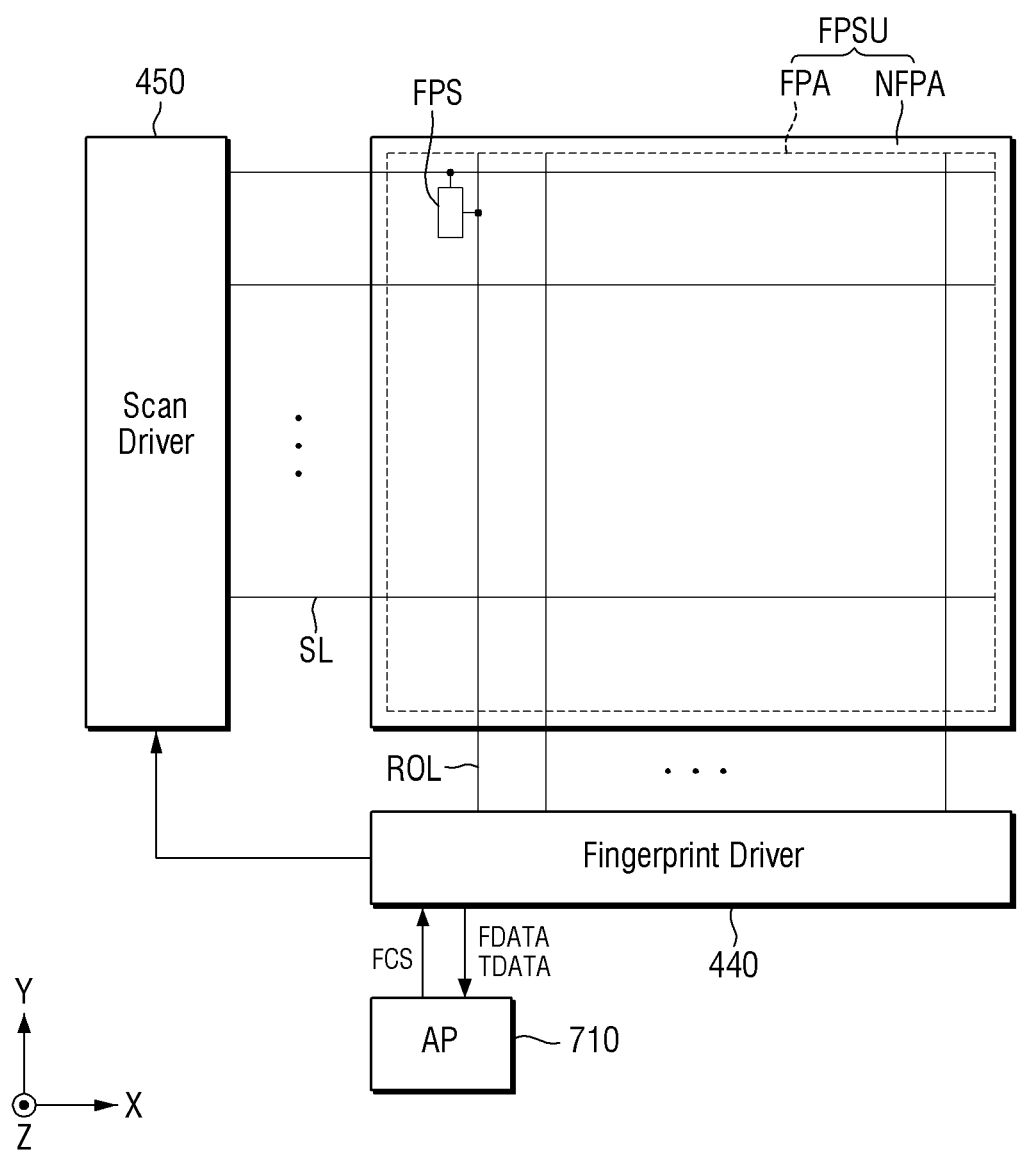
FIG. 7 is a block diagram illustrating a fingerprint sensing unit, a fingerprint sensor driver, a scan driver, and the main processor of the display device of FIG. 1.

FIG. 7 is a block diagram illustrating the fingerprint sensing unit FPSU, the fingerprint sensor driver 440, a scan driver 450, and the main processor 710 of the display device 10 according to the embodiment.

Referring to FIG. 7, the fingerprint sensing unit FPSU may include a fingerprint recognition area FPA and a non-fingerprint recognition area NFPA.

The fingerprint recognition area FPA may include a plurality of fingerprint sensors FPS, a plurality of scan lines SL, and a plurality of read-out lines ROL. The fingerprint sensors FPS may include at least one of an optical fingerprint sensor, an ultrasonic fingerprint sensor, and a capacitive fingerprint sensor.

The fingerprint sensors FPS may be connected to the scan driver 450 through the scan lines SL and may receive scan signals from the scan driver 450. The scan lines SL may extend in the first direction (e.g., X-axis direction) and may be spaced apart from each other in the second direction (e.g., Y-axis direction). The scan driver 450 may supply a scan signal to each of the fingerprint sensors FPS to select fingerprint sensors FPS which will sense a change in a sensing signal.

The fingerprint sensors FPS may be connected to the fingerprint sensor driver 440 through the read-out lines ROL. The fingerprint sensors FPS may supply sensing signals to the fingerprint sensor driver 440 through the read-out lines ROL. The read-out lines ROL may be spaced apart from each other in the first direction (e.g., X-axis direction) and may extend in the second direction (e.g., Y-axis direction).

The non-fingerprint recognition area NFPA may be disposed outside the fingerprint recognition area FPA. The non-fingerprint recognition area NFPA may be defined as an area excluding the fingerprint recognition area FPA. For example, the scan driver 450 may be disposed on a side of the non-fingerprint recognition area NFPA and connected to the scan lines SL extending from the fingerprint recognition area FPA.

In the first mode, the fingerprint sensor driver 440 may convert a sensing signal into fingerprint sensing data FDATA in digital data and transmit the fingerprint sensing data FDATA to the main processor 710. In the second mode, the fingerprint sensor driver 440 may convert a sensing signal into the touch sensing data TDATA and transmit the touch sensing data TDATA to the main processor 710. Here, the fingerprint sensor driver 440 may operate according to the first mode in a preset step including at least one of a locking step, an approval step, and a user authenticating step, but embodiments are not limited thereto. The fingerprint sensor driver 440 may operate according to the second mode in a step other than the first mode.

The main processor 710 may supply a fingerprint control signal FCS to the fingerprint sensor driver 440. The main processor 710 may control the driving timing of the fingerprint sensor driver 440 using the fingerprint control signal FCS.

In the first mode, the main processor 710 may generate a fingerprint image by receiving the fingerprint sensing data FDATA from the fingerprint sensor driver 440 and recognize or determine a user's fingerprint pattern. Therefore, the main processor 710 may perform authentication according to the user's fingerprint or execute a task or an application in the first mode.

In the second mode, the main processor 710 may receive the touch sensing data TDATA including touch coordinate information of the user from the fingerprint sensor driver 440 and execute a task or application indicated by an icon displayed at touch coordinates of the finger.

Figure 8:
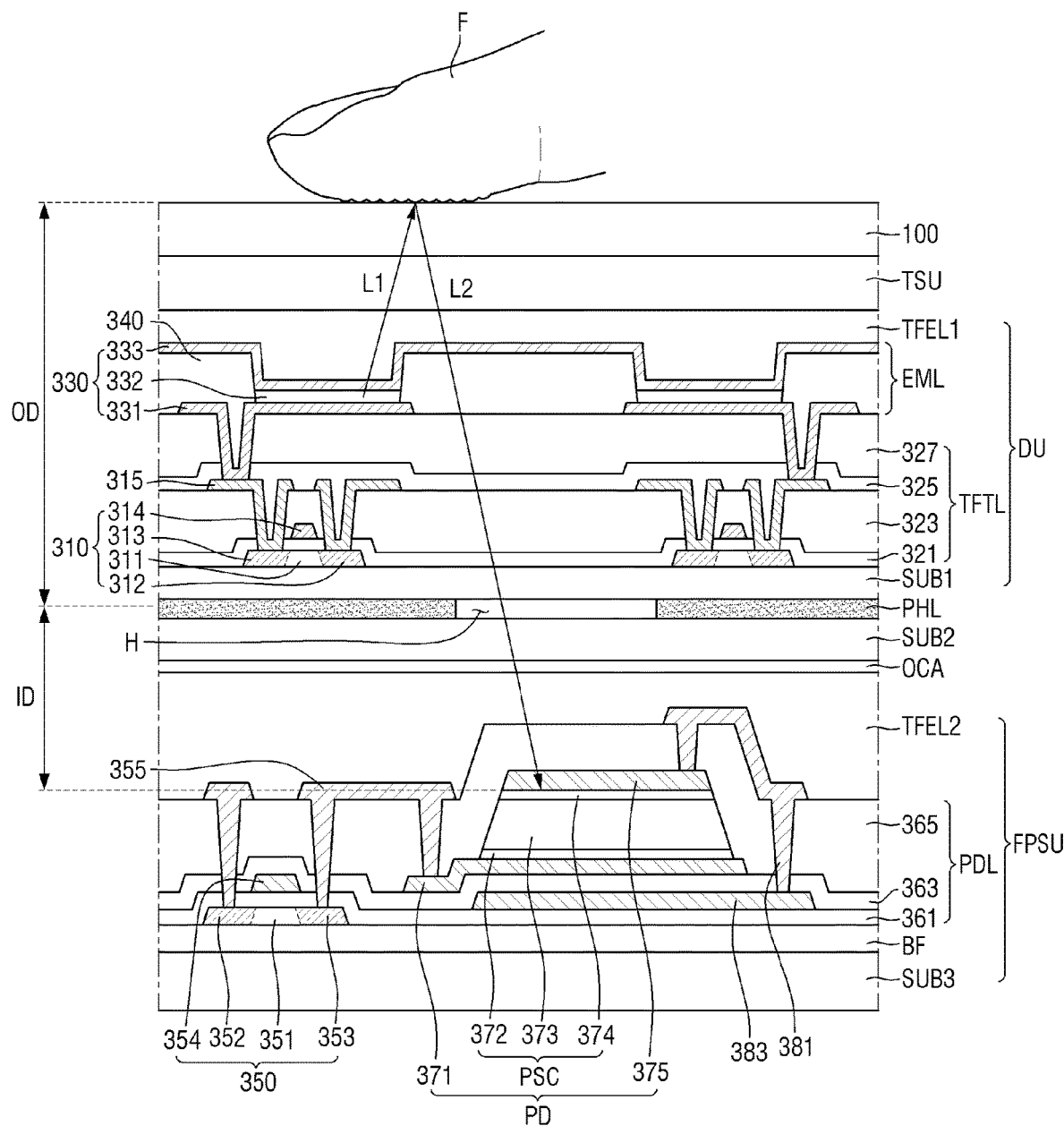
FIG. 8 is a cross-sectional view of the display device of FIG. 1 illustrating a display unit and the fingerprint sensing unit thereof.

FIG. 8 is a cross-sectional view of the display device 10 according to the embodiment. In the following description, the same elements as those described above will be briefly described or will not be described for descriptive convenience.

Referring to FIG. 8, the display panel 300 may include the display unit DU, the touch sensing unit TSU, a second substrate SUB2, an optical system PHL, and the fingerprint sensing unit FPSU. The display unit DU may include the first substrate SUB1, the thin-film transistor layer TFTL, the light emitting element layer EML, and the first encapsulation layer TFEL1. The fingerprint sensing unit FPSU may include a third substrate SUB3, a buffer layer BF, a light receiving element layer PDL, and a second encapsulation layer TFEL2. Although the fingerprint sensors FPS of the fingerprint sensing unit FPSU are illustrated as optical fingerprint sensors in FIG. 8, the type of the fingerprint sensors FPS is not limited thereto.

The first substrate SUB1 may be a base substrate or a base member and may be made of an insulating material such as polymer resin. The first substrate SUB1 may be a flexible substrate that can be bent, folded, rolled, etc.

The thin-film transistor layer TFTL may be disposed on the first substrate SUB1. The thin-film transistor layer TFTL may include a plurality of thin-film transistors 310 constituting a pixel circuit of the pixels SP and a first connection electrode 315. The thin-film transistor layer TFTL may further include a gate insulating layer 321, an interlayer insulating film 323, a protective layer 325, and a planarization layer 327. Each of the thin-film transistors 310 may include a semiconductor region 311, a source electrode 312, a drain electrode 313, and a gate electrode 314.

The semiconductor region 311, the source electrode 312, and the drain electrode 313 may be disposed on the first substrate SUB1. The semiconductor region 311 may be overlapped by the gate electrode 314 in the thickness direction and may be insulated from the gate electrode 314 by the gate insulating layer 321. The source electrode 312 and the drain electrode 313 may be formed by modifying the material of the semiconductor region 311 to be conductive.

The gate electrode 314 may be disposed on the gate insulating layer 321. The gate electrode 314 may overlap the semiconductor region 311 with the gate insulating layer 321 interposed between them.

The gate insulating layer 321 may be provided on the semiconductor region 311, the source electrode 312, and the drain electrode 313. For example, the gate insulating layer 321 may cover the semiconductor region 311, the source electrode 312, the drain electrode 313 and the first substrate SUB1 and may insulate the semiconductor region 311 from the gate electrode 314. The gate insulating layer 321 may include a contact hole through which the first connection electrode 315 passes.

The interlayer insulating film 323 may be disposed on the gate electrode 314. For example, the interlayer insulating film 323 may include a contact hole through which the first connection electrode 315 passes. Here, the contact hole of the interlayer insulating film 323 may be connected to the contact hole of the gate insulating layer 321.

The first connection electrode 315 may be disposed on the interlayer insulating film 323. The first connection electrodes 315 may connect the drain electrode 313 of each thin-film transistor 310 to a first electrode 331 of each light emitting element 330. The first connection electrode 315 may contact the drain electrode 313 through the contact hole provided in the gate insulating layer 321 and the interlayer insulating film 323.

The protective layer 325 may be provided on the thin-film transistors 310 to protect the thin-film transistors 310. For example, the protective layer 325 may include a contact hole through which the first electrode 331 of each light emitting element 330 passes.

The planarization layer 327 may be provided on the protective layer 325 to planarize the tops of the thin-film transistors 310. For example, the planarization layer 327 may include a contact hole through which the first electrode 331 of each light emitting element 330 passes. Here, the contact hole of the protective layer 325 and the contact hole of the planarization layer 327 may be connected to each other so that the first electrode 331 of each light emitting element 330 can pass through the contact holes.

The light emitting element layer EML may be provided on the thin-film transistor layer TFTL. The light emitting element layer EML may include the light emitting elements 330 connected to the thin-film transistors 310.

Each of the light emitting elements 330 may include the first electrode 331, a light emitting layer 332, and a second electrode 333.

The first electrode 331 may be provided on the planarization layer 327. For example, the first electrode 331 may overlap an opening area of the light emitting element layer EML which is defined by a pixel defining layer 340. In addition, the first electrode 331 may contact the first connection electrode 315 through a contact hole provided in the planarization layer 327 and the protective layer 325. For example, the first electrode 331 may serve as an anode of each light emitting element 330.

The light emitting layer 332 may be provided on the first electrode 331. The light emitting layer 332 may include a hole injecting layer, a hole transporting layer, a light emitting layer, an electron blocking layer, an electron transporting layer, and an electron injecting layer. For example, the light emitting layer 332 may be an organic light emitting layer made of an organic material. However, embodiments are not limited thereto. When the light emitting layer 332 is an organic light emitting layer, when a thin-film transistor 310 of the thin-film transistor layer TFTL applies a predetermined voltage to the first electrode 331 of a light emitting element 330 and the second electrode 333 of the light emitting element 330 receives a common voltage or a cathode voltage, holes and electrons may move to the organic light emitting layer 332 through the hole transporting layer and the electron transporting layer, respectively, and may combine together in the organic light emitting layer 332 to emit light.

The second electrode 333 may be provided on the light emitting layer 332. For example, the second electrode 333 may be implemented as an electrode that is commonly provided to all pixels SP without distinction between the pixels SP.

The light emitting element layer EML may include the pixel defining layer 340 which defines the pixels SP. The first electrode 331 and the light emitting layer 332 of each light emitting element 330 may be spaced apart and insulated from those of another light emitting element 330 by the pixel defining layer 340.

The first encapsulation layer TFEL1 may be disposed on the light emitting element layer EML to cover the thin-film transistor layer TFTL and the light emitting element layer EML. The first encapsulation layer TFEL1 may prevent oxygen or moisture from penetrating into the light emitting element layer EML.

The touch sensing unit TSU may be disposed on the first encapsulation layer TFEL1. The touch sensing unit TSU may include the touch electrodes SEN for sensing a user's touch in a capacitive manner and the touch lines TL and RL connecting the touch electrodes SEN and the touch driver 430. For example, the touch sensing unit TSU may sense a touch of a touch input member or a user in a mutual capacitance manner or a self-capacitance manner.

The cover window 100 may be disposed on the display panel 300. The cover window 100 may be disposed on the touch sensing unit TSU of the display panel 300. For example, the cover window 100 may be attached onto the touch sensing unit TSU by a clear adhesive member. The cover window 100 may directly contact a user's finger F.

The optical system PHL may cover a lower surface of the first substrate SUB1. The optical system PHL may be disposed between the first substrate SUB1 and the second substrate SUB2 to block light incident on the thin-film transistor layer TFTL and the light emitting element layer EML. The optical system PHL may include a plurality of holes H. Each of the holes H may be an optical passage through which second light L2 obtained after first light L1 emitted from the light emitting element layer EML is reflected by the user's finger F travels to the fingerprint sensing unit FPSU.

The second substrate SUB2 may be disposed under the optical system PHL to support the optical system PHL and the display unit DU. For example, the second substrate SUB2 may be made of an insulating material such as polymer resin.

The fingerprint sensing unit FPSU may be disposed under the display panel 300. For example, the fingerprint sensing unit FPSU may be disposed under the second substrate SUB2. An upper end of the second substrate SUB2 may face the display unit DU or the optical system PHL, and a lower end of the second substrate SUB2 may face the fingerprint sensing unit FPSU. For example, an upper surface of the fingerprint sensing unit FPSU may be attached to a lower surface of the second substrate SUB2 by an adhesive member OCA.

For another example, the second substrate SUB2 may be omitted, and the upper surface of the fingerprint sensing unit FPSU may be directly attached to a lower surface of the optical system PHL by the adhesive member OCA.

For example, when the user's finger F touches the cover window 100, the first light L1 output from the light emitting element layer EML is reflected by ridges or valleys of the finger F, and the reflected second light L2 passes through a hole H of the optical system PHL to reach the fingerprint sensing unit FPSU disposed under the second substrate SUB2.

The fingerprint sensing unit FPSU may include the third substrate SUB3, the buffer layer BF, the light receiving element layer PDL, and the second encapsulation layer TFEL2.

The third substrate SUB3 may be a base substrate or a base member of the fingerprint sensing unit FPSU and may be made of an insulating material such as polymer resin. For example, the third substrate SUB3 may be a rigid substrate. For another example, the third substrate SUB3 may be a flexible substrate that can be bent, folded, rolled, etc. When the third substrate SUB3 is a flexible substrate, the third substrate SUB3 may be made of polyimide (PI). However, embodiments are not limited thereto.

The buffer layer BF may be disposed on the third substrate SUB3. The buffer layer BF may be formed of an inorganic layer that can prevent penetration of air or moisture. For example, the buffer layer BF may include a plurality of inorganic layers stacked alternately.

The light receiving element layer PDL may be disposed on the buffer layer BF. The light receiving element layer PDL may include at least one switching transistor 350 for driving each of the fingerprint sensors FPS, a second connection electrode 355, and a light receiving element PD.

The at least one switching transistor 350 may include a semiconductor region 351, a source electrode 352, a drain electrode 353, and a gate electrode 354.

The semiconductor region 351, the source electrode 352, and the drain electrode 353 may be disposed on the buffer layer BF. The semiconductor region 351 may be overlapped by the gate electrode 354 in the thickness direction and may be insulated from the gate electrode 354 by a first insulating layer 361. The source electrode 352 and the drain electrode 353 may be formed by modifying the material of the semiconductor region 351 to be conductive.

The gate electrode 354 may be disposed on the first gate insulating layer 361. The gate electrode 354 may overlap the semiconductor region 351 with the first insulating layer 361 interposed between them.

The first insulating layer 361 may be disposed on the semiconductor region 351, the source electrode 352, and the drain electrode 353. A second insulating layer 363 may be disposed on the gate electrode 354. A third insulating layer 365 may be disposed on the second insulating layer 363.

The second connection electrode 355 may be disposed on the third insulating layer 365. The second connection electrode 355 may connect the drain electrode 353 of the switching transistor 350 and a first electrode 371 of the light receiving element PD. An end of the second connection electrode 355 may be connected to the drain electrode 353 through contact holes of the first, second, and third insulating layers 361, 363 and 365, and the other end of the second connection electrode 355 may be connected to the first electrode 371 of the light receiving element PD through a contact hole of the third insulating layer 365.

The light receiving element PD may include the first electrode 371, a light receiving layer PSC, and a second electrode 375.

The first electrode 371 of the light receiving element PD may be disposed on the second insulating layer 363. The first electrode 371 may be connected to the second connection electrode 355 through the contact hole penetrating the third insulating layer 365.

The light receiving layer PSC may be disposed on the first electrode 371. For example, the light receiving layer PSC may include an N-type semiconductor layer 372, an I-type semiconductor layer 373, and a P-type semiconductor layer 374 stacked sequentially. When the light receiving layer PSC is formed in a PIN structure including the N-type semiconductor layer 372, the I-type semiconductor layer 373 and the P-type semiconductor layer 374, the I-type semiconductor layer 373 may be depleted by the P-type semiconductor layer 374 and the N-type semiconductor layer 372, and an electric field may be generated inside the I-type semiconductor layer 373. In addition, holes and electrons generated by reflected light may be drifted by the electric field. Therefore, the holes may be collected to the second electrode 375 through the P-type semiconductor layer 374, and the electrons may be collected to the first electrode 371 through the N-type semiconductor layer 372.

The P-type semiconductor layer 374 may be disposed relatively close to an incident surface of the second light L2 or the reflected light, and the N-type semiconductor layer 372 may be disposed relatively far from the incident surface of the reflected light. Since drift mobility of holes is lower than drift mobility of electrons, the P-type semiconductor layer 374 disposed close to the incident surface of the reflected light can maximize the efficiency of collecting the reflected light.

The second electrode 375 of the light receiving element PD may be disposed on the P-type semiconductor layer 374. The second electrode 375 may be connected to a third connection electrode 381 through a contact hole penetrating the third insulating layer 365. The second electrode 375 may include a transparent conductive material that can transmit light. For example, the second electrode 375 may include at least one of indium tin oxide (ITO), indium zinc oxide (IZO), and indium tin zinc oxide (ITZO). However, embodiments are not limited thereto.

The third connection electrode 381 may be disposed on the third insulating layer 365. For example, the third connection electrode 381 disposed on the third insulating layer 365 may be spaced apart from the second connection electrode 355. An end of the third connection electrode 381 may be connected to the second electrode 375 of the light receiving element PD through the contact hole penetrating the third insulating layer 365. The other end of the third connection electrode 381 may be connected to a fourth connection electrode 383 through a contact hole penetrating the second and third insulating layers 363 and 365.

The fourth connection electrode 383 may be disposed on the first insulating layer 361 to overlap the light receiving element PD. For example, the fourth connection electrode 383 and the gate electrode 354 of the switching transistor 350 may be disposed on the same layer (e.g., the first insulating layer 361). The fourth connection electrode 383 may be insulated from the first electrode 371 of the light receiving element PD with the second insulating layer 363 interposed between them.

The second encapsulation layer TFEL2 may be disposed on the light receiving element layer PDL. The second encapsulation layer TFEL2 may cover the second connection electrode 355, the third connection electrode 381, and the third insulating layer 365. The second encapsulation layer TFEL2 may prevent oxygen or moisture from penetrating into the light receiving element layer PDL. An upper surface of the second encapsulation layer TFEL2 may be attached to the lower surface of the second substrate SUB2 by the adhesive member OCA.

Figure 9:
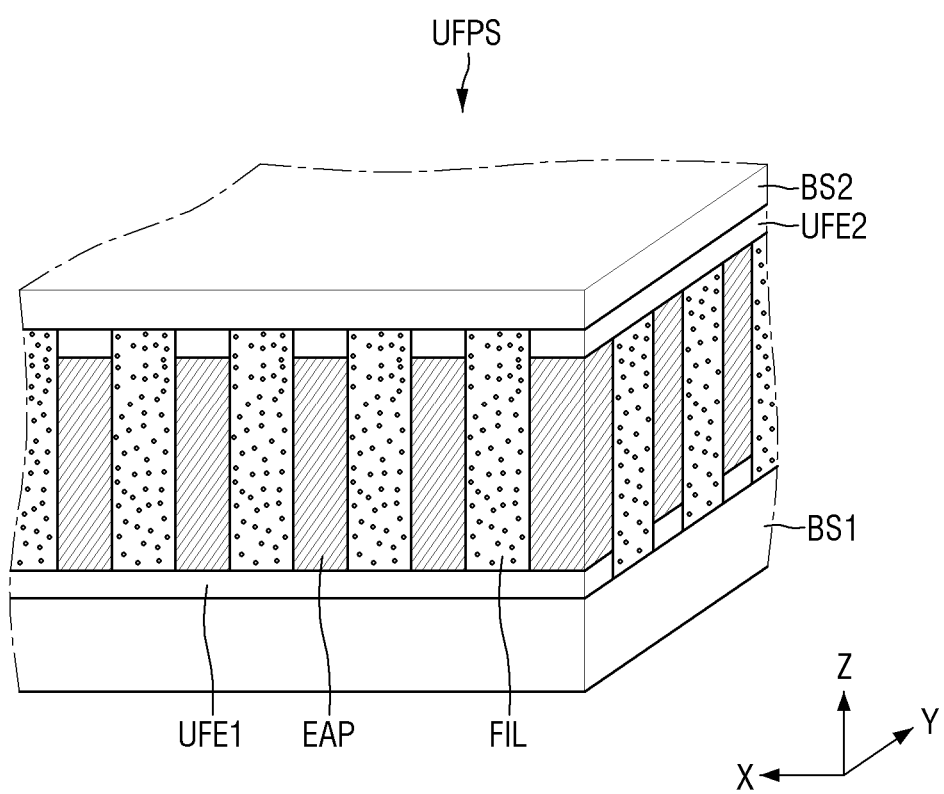
FIG. 9 is a perspective view of an embodiment of ultrasonic fingerprint sensors of the display device of FIG. 1t.

FIG. 9 is a perspective view of ultrasonic fingerprint sensors UFPS of a display device according to an embodiment.

Referring to FIG. 9, a fingerprint sensing unit FPSU may include a plurality of ultrasonic fingerprint sensors UFPS.

Each of the ultrasonic fingerprint sensors UFPS may include a first base member BS1, a second base member BS2, a first ultrasonic electrode UFE1, a second ultrasonic electrode UFE2, a vibration element EAP, and a filling member FIL.

The first base member BS1 and the second base member BS2 may be disposed to face each other. Each of the first and second base members BS1 and BS2 may include a plastic film or glass.

The first ultrasonic electrode UFE1 may be disposed on a surface of the first base member BS1 which faces the second base member BS2. A plurality of first ultrasonic electrodes UFE1 may extend in the first direction (e.g., X-axis direction) and may be spaced apart from each other in the second direction (e.g., Y-axis direction). A plurality of vibration elements EAP arranged in the first direction (e.g., X-axis direction) may be connected to the same first ultrasonic electrode UFE1.

The second ultrasonic electrode UFE2 may be disposed on a surface of the second base member BS2 which faces the first base member BS1. A plurality of second ultrasonic electrodes UFE2 may extend in the second direction (e.g., Y-axis direction) and may be spaced apart from each other in the first direction (e.g., X-axis direction). A plurality of vibration elements EAP arranged in the second direction (e.g., Y-axis direction) may be connected to the same second ultrasonic electrode UFE2.

The vibration elements EAP may be arranged in a matrix form. The vibration elements EAP may be spaced apart from each other in the first direction (e.g., X-axis direction) and the second direction (e.g., Y-axis direction). For example, each of the vibration elements EAP may be shaped like a square pillar or a rectangular parallelepiped extending in the thickness direction (e.g., Z-axis direction) of the fingerprint sensing unit FPSU. However, embodiments are not limited thereto. For another example, each of the vibration elements EAP may be shaped like a circular cylinder or an elliptical cylinder.

Each of the vibration elements EAP may be a piezoelectric element including a piezoelectric material. Each of the vibration elements EAP may vibrate by contracting or expanding according to an electrical signal. For example, each of the vibration elements EAP may include at least one of polyvinylidene fluoride (PVDF), polarized fluoropolymer, PVDF-TrEF copolymer, plumbum ziconate titanate (PZT), and electroactive polymer.

The filling member FIL may fill a space between the vibration elements EAP. The filing member FIL may be made of a flexible material so that the vibration elements EAP can contract or expand with the filling member FIL interposed between them. The filling member FIL may include an insulating material to insulate the vibration elements EAP from each other.

Figure 10:
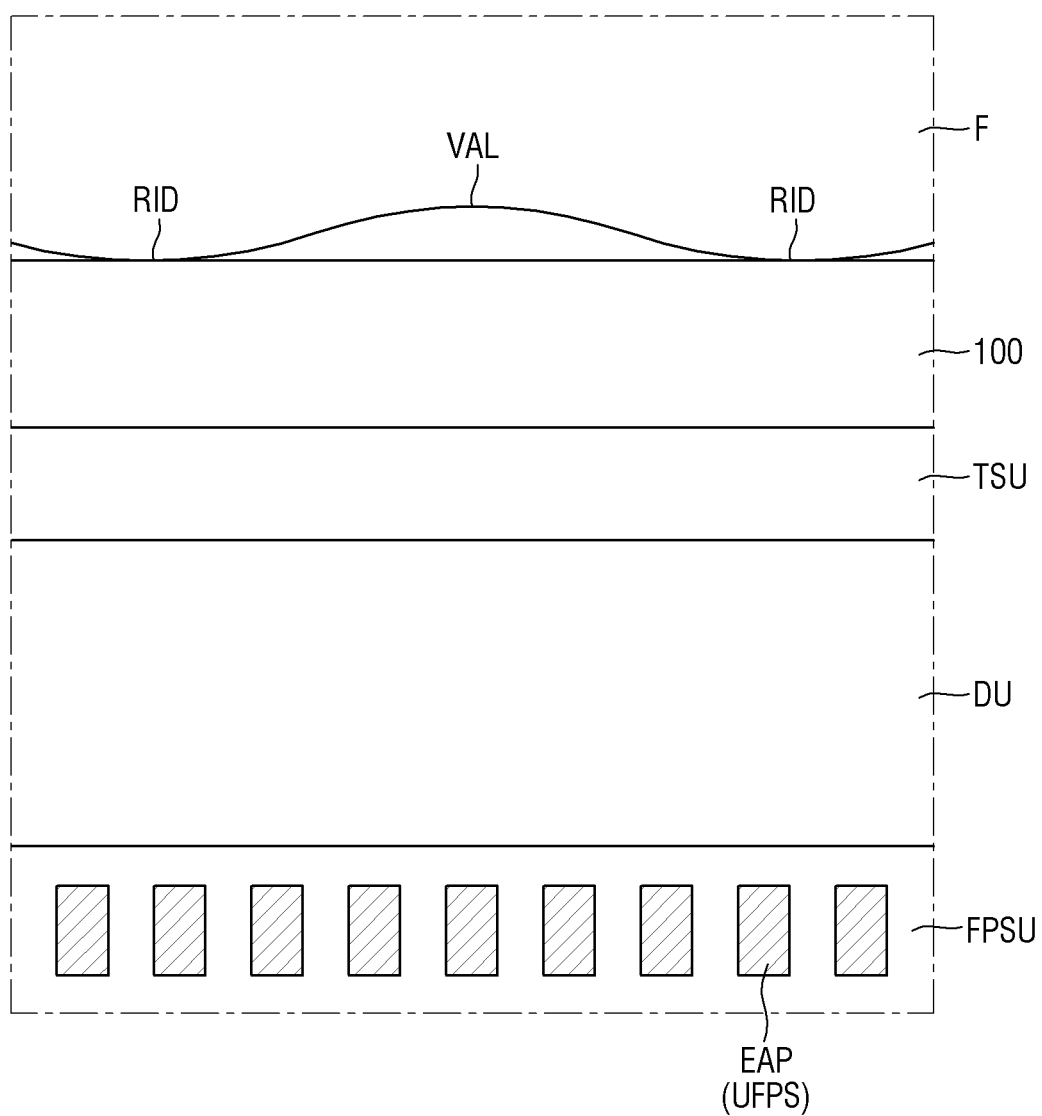
FIG. 10 is a cross-sectional view illustrating a sensing method of the ultrasonic fingerprint sensors of the display device of FIG. 9.

FIG. 10 is a cross-sectional view illustrating a sensing method of the ultrasonic fingerprint sensors UFPS of the display device according to the embodiment of FIG. 9.

Referring to FIG. 10, the fingerprint sensing unit FPSU may include a plurality of ultrasonic fingerprint sensors UFPS. A fingerprint of a finger F may include a plurality of ridges RID and a valley VAL between the ridges RID. When a user's finger F touches a surface of a cover window 100, the ridges RID may directly contact the cover window 100, and the valley VAL may not contact the cover window 100.

Each of the ultrasonic fingerprint sensors UFPS may output ultrasonic waves based on an ultrasonic driving signal and may receive the ultrasonic waves reflected by the ridges RID or valley VAL of the finger F. Each of the vibration elements EAP of the ultrasonic fingerprint sensors UFPS may receive the reflected ultrasonic waves. An impedance or voltage of a vibration element EAP receiving ultrasonic waves reflected by a ridge RID and an impedance or voltage of a vibration element EAP receiving ultrasonic waves reflected by the valley VAL may be different from each other. A fingerprint sensor driver 440 may be connected to the first and second ultrasonic electrodes UFE1 and UFE2 to sense the impedances or voltages of the vibration elements EAP and recognize or sense a user's fingerprint.

Figure 11:
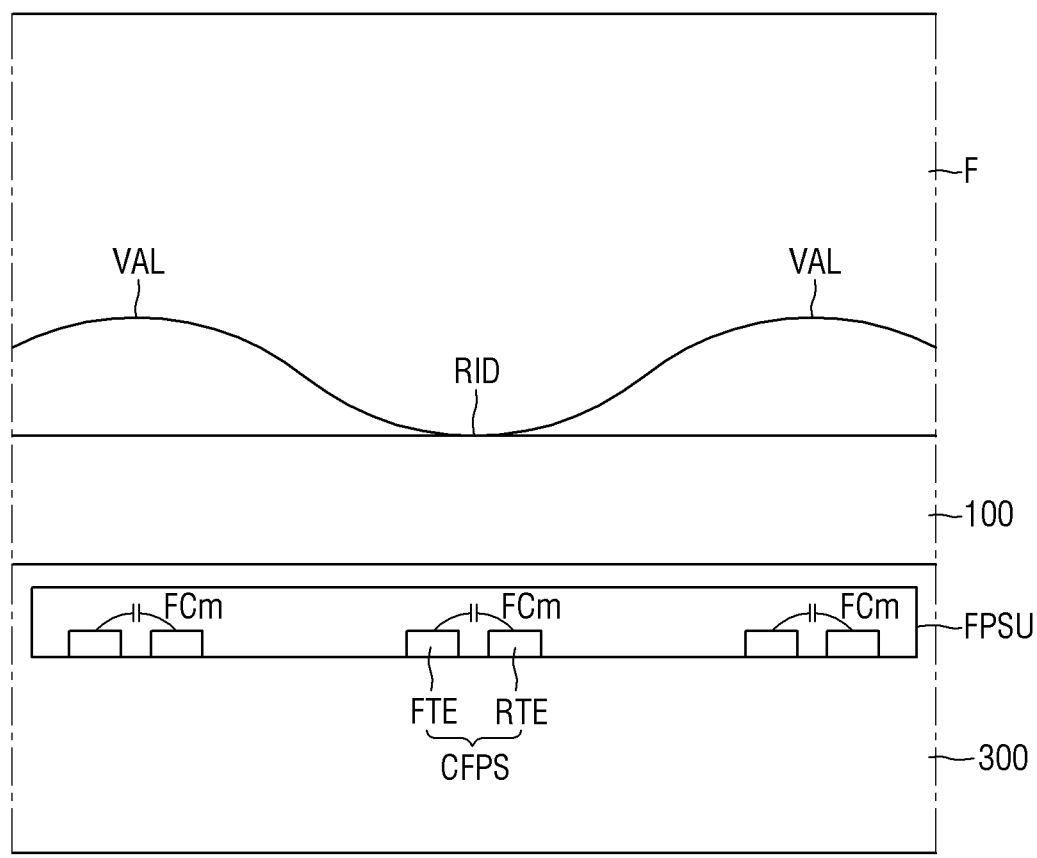
FIG. 11 is a cross-sectional view illustrating a sensing method of capacitive fingerprint sensors of the display device of FIG. 1.

FIG. 11 is a cross-sectional view illustrating a sensing method of capacitive fingerprint sensors CFPS of a display device according to an embodiment.

Referring to FIG. 11, a fingerprint sensing unit FPSU may include a plurality of capacitive fingerprint sensors CFPS. Each of the capacitive fingerprint sensors CFPS may include a fingerprint driving electrode FTE and a fingerprint sensing electrode RTE.

The fingerprint driving electrode FTE and the fingerprint sensing electrode RTE may be driven in a mutual capacitance manner. A fingerprint sensor driver 440 may supply a fingerprint driving signal to the fingerprint driving electrode FTE and receive a sensing signal from the fingerprint sensing electrode RTE. The fingerprint sensor driver 440 for receiving the sensing signal may sense a change in mutual capacitance FCm of the fingerprint driving electrode FTE and the fingerprint sensing electrode RTE.

A change in mutual capacitance FCm corresponding to a ridge RID of a finger F and a change in mutual capacitance FCm corresponding to valleys VAL of the finger F may be different from each other. The fingerprint sensor driver 440 may recognize or sense a user's fingerprint by sensing a difference between the change in the mutual capacitance FCm corresponding to the ridge RID of the finger F and the change in the mutual capacitance FCm corresponding to the valleys VAL of the finger F.

Figure 12:
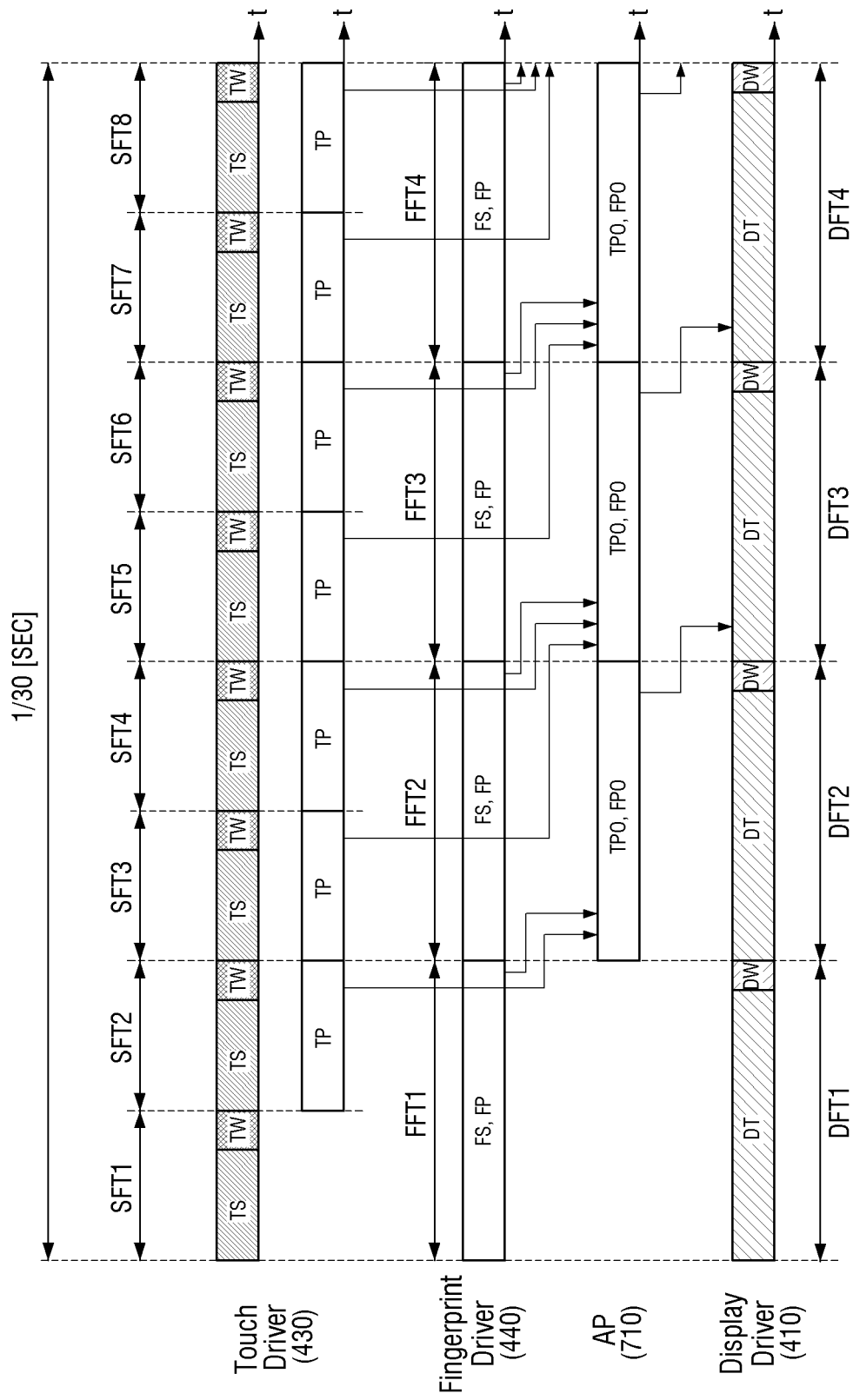
FIG. 12 is a timing diagram illustrating a driving timing for operating the display device of FIG. 1.

FIG. 12 is a timing diagram illustrating the driving timing of a display device according to an embodiment. Here, the driving timing of the display device of FIG. 12 corresponds to a case where a fingerprint sensor driver 440 is driven in a second mode.

Referring to FIG. 12, a display driver 410, a touch driver 430, and the fingerprint sensor driver 440 may be driven in synchronization with each other, but embodiments are not limited thereto. The display driver 410 may drive a plurality of pixels SP at a first frequency, the fingerprint sensor driver 440 may drive a plurality of fingerprint sensors FPS at the first frequency or a second frequency different from the first frequency, and the touch driver 430 may drive a plurality of touch electrodes SEN at a third frequency which is an integer multiple of the first frequency or the second frequency. For example, the touch driver 430 may have a driving frequency of 240 Hz, and the display driver 410 and the fingerprint sensor driver 440 may have a driving frequency of 120 Hz. In this case, first and second touch frame periods SFT1 and SFT2 of the touch driver 430 may correspond to a first display frame period DFT1 of the display driver 410 and a first fingerprint frame period FFT1 of the fingerprint sensor driver 440.

The display driver 410 may drive the pixels SP during a plurality of display frame periods DFT1 through DFT4 determined by the driving frequency of the touch driver 430. For example, the display driver 410 may supply gate signals and data voltages to the pixels SP during the first display frame period DFT1. The display driver 410 may sequentially supply the gate signals to the pixels SP arranged along a plurality of rows during the first display frame period DFT1, and the pixels SP may display images in an order in which the pixels SP are selected by the gate signals.

The touch driver 430 may drive the touch electrodes SEN during a plurality of touch frame periods SFT1 through SFT8 determined by the driving frequency of the touch driver 430. For example, the touch driver 430 may supply touch driving signals to a plurality of touch driving electrodes TE during a touch sensing period TS of the first touch frame period SFT1 and may receive touch sensing signals from a plurality of touch sensing electrodes RE. The touch driver 430 may sequentially supply the touch driving signals from the touch driving electrodes TE disposed on a side of a touch sensor area TSA to the touch driving electrodes TE disposed on the other side of the touch sensor area TSA during the touch sensing period TS. Therefore, the touch driver 430 may receive a change in capacitance between the touch driving electrodes TE and the touch sensing electrodes RE during the touch sensing period TS, thereby receiving sensing information of a touch input member.

The touch driver 430 may stop the supply of the touch driving signals during a touch waiting period TW of the first touch frame period SFT1.

The touch driver 430 may receive sensing information of the touch input member during the first touch frame period SFT1 and generate touch sensing data during the second touch frame period SFT2 through a process TP of processing the sensing information of the first touch frame period SFT1. Here, the sensing information of the touch input member may include coordinate information, identification information, and state information of the touch input member. For example, the identification information of the touch input member may include a user's ID or personal information, and the state information of the touch input member may include a battery state or an operation state of the touch input member. However, embodiments are not limited thereto. The touch driver 430 may supply the touch sensing data generated during the second touch frame period SFT2 to a main processor 710.

The touch driver 430 may receive sensing information of the touch input member during the second touch frame period SFT2 and generate touch sensing data during a third touch frame period SFT3 through a process TP of processing the sensing information of the second touch frame period SFT2. The touch driver 430 may supply the touch sensing data generated during the third touch frame period SFT3 to the main processor 710.

The fingerprint sensor driver 440 may drive the fingerprint sensors FPS during a plurality of fingerprint frame periods FFT1 through FFT4 determined by the driving frequency of the fingerprint sensor driver 440. For example, the fingerprint sensor driver 440 may supply scan signals to the fingerprint sensors FPS during the first fingerprint frame period FFT1 and may receive sensing signals. The fingerprint sensor driver 440 may sequentially supply the scan signals to the fingerprint sensors FPS arranged along a plurality of rows during the first fingerprint frame period FFT1, and the fingerprint sensors FPS may output the sensing signals in an order in which the fingerprint sensors FPS are selected by the scan signals.

In the second mode, the fingerprint sensor driver 440 may receive sensing information of a user's finger through a sensing process FS and generate touch sensing data through a process FP of processing the sensing information during the first fingerprint frame period FFT1. Here, the sensing information of the finger may include coordinate information of the finger. The fingerprint sensor driver 440 may supply the touch sensing data generated during the first fingerprint frame period FFT1 to the main processor 710.

In the second mode, the fingerprint sensor driver 440 may receive sensing information of the user's finger through a sensing process FS and generate touch sensing data through a process FP of processing the sensing information during a second fingerprint frame period FFT2. The fingerprint sensor driver 440 may supply the fingerprint sensing data generated during the second fingerprint frame period FFT2 to the main processor 710.

In the second mode, the main processor 710 may receive the touch sensing data generated during the second touch frame period SFT2 from the touch driver 430 and may receive the touch sensing data generated during the first fingerprint frame period FFT1 from the fingerprint sensor driver 440. During the second fingerprint frame period FFT2, the main processor 710 may perform a task corresponding to the sensing information of the touch input member through a process TPO of processing the touch sensing data of the touch driver 430 and may perform a task corresponding to the sensing information of the finger through a process FPO of processing the touch sensing data of the fingerprint sensor driver 440. For example, the main processor 710 may simultaneously process the touch sensing data of the touch driver 430 and the touch sensing data of the fingerprint sensor driver 440 during the second fingerprint frame period FFT2. For another example, the main processor 710 may divide the second fingerprint frame period FFT2 to process the touch sensing data of the touch driver 430 during a part of the second fingerprint frame period FFT2 and process the touch sensing data of the fingerprint sensor driver 440 during the other part of the second fingerprint frame period FFT2. Here, the second fingerprint frame period FFT2 may correspond to a second display frame period DFT2.

In the second mode, the main processor 710 may receive touch sensing data generated during the third and fourth touch frame periods SFT3 and SFT4 from the touch driver 430 and receive touch sensing data generated during the second fingerprint frame period FFT2 from the fingerprint sensor driver 440. During a third fingerprint frame period FFT3, the main processor 710 may perform a task corresponding to sensing information of the touch input member through a process TPO of processing the touch sensing data of the touch driver 430 and may perform a task corresponding to sensing information of the finger through a process FPO of processing the touch sensing data of the fingerprint sensor driver 440. Here, the third fingerprint frame period FFT3 may correspond to a third display frame period DFT3.

Therefore, the main processor 710 may simultaneously drive the touch driver 430 and the fingerprint sensor driver 440 in the second mode and may receive the touch sensing data from each of the touch driver 430 and the fingerprint sensor driver 440. The main processor 710 may simultaneously process the touch sensing data of the touch driver 430 and the touch sensing data of the fingerprint sensor driver 440 during one display frame period or one fingerprint frame period. For example, when the touch input member and the user's finger touch a plurality of points on the display device 10, the main processor 710 may simultaneously drive the touch driver 430 and the fingerprint sensor driver 440 to execute a task or application indicated by an icon displayed at touch coordinates of each of the touch input member and the user's finger. Since the display device 10 simultaneously drives the touch driver 430 and the fingerprint sensor driver 440 in the second mode, even when the display device 10 is driven at a high-speed driving frequency, the touch input member and the user's finger can be simultaneously recognized or sensed, and the touch sensitivity and touch reliability of the display device 10 can be improved or enhanced.

The display driver 410 may receive information about task performed by the main processor 710 during the second display frame period DFT2 and may display an image corresponding to the information about task during the third display frame period DFT3. The display driver 410 may receive information about task performed by the main processor 710 during the third display frame period DFT3 and may display an image corresponding to the information about task during a fourth display frame period DFT4.

Figure 13:
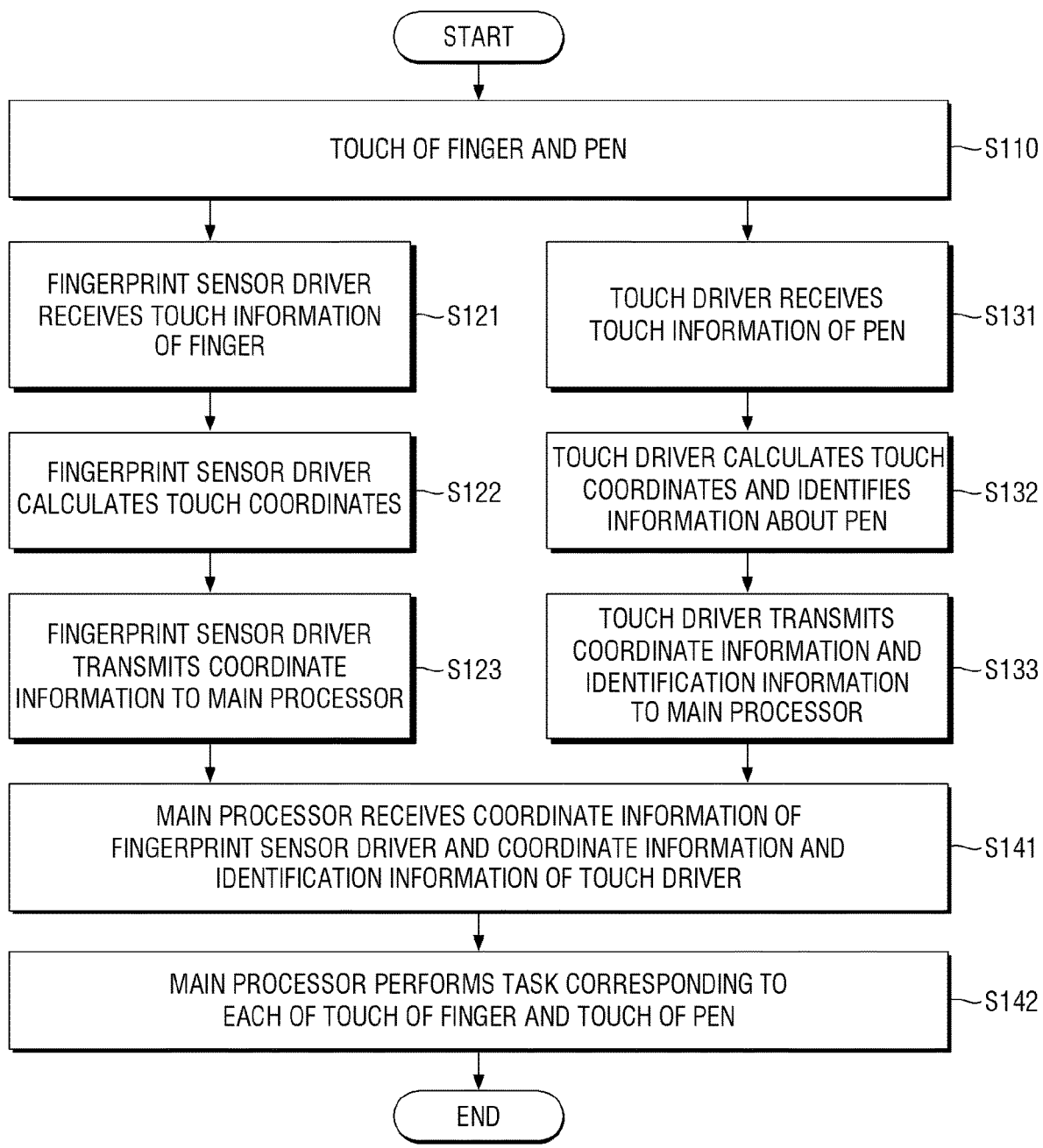
FIG. 13 is a flowchart illustrating an embodiment of a process of driving the display device of FIG. 1.

FIG. 13 is a flowchart illustrating a process of driving a display device according to an embodiment. Here, the process of driving the display device of FIG. 13 corresponds to a case where a fingerprint sensor driver 440 is driven in a second mode.

Referring to FIG. 13, a touch input member and a user's finger may touch a surface of display device 10 or a cover window 100 in an operation S110.

The fingerprint sensor driver 440 may receive sensing signals from a plurality of fingerprint sensors FPS in the second mode in an operation S121. The sensing signals of the fingerprint sensors FPS may include touch information of the finger.

The fingerprint sensor driver 440 may calculate touch coordinates of the finger based on the sensing signals in an operation S122. The fingerprint sensor driver 440 may generate touch sensing data by calculating the touch coordinates of the finger.

The fingerprint sensor driver 440 may transmit the touch sensing data including coordinate information of the user's touch to a main processor 710 in an operation S123.

A touch driver 430 may receive sensing signals from a plurality of touch electrodes SEN in an operation S131. The sensing signals of the touch electrodes SEN may include touch information of the touch input member such as a pen.

The touch driver 430 may calculate touch coordinates of the touch input member based on the sensing signals and identify information about the touch input member in an operation S132. The touch driver 430 may generate touch sensing data including coordinate information, identification information, and state information of the touch input member.

The touch driver 430 may transmit the touch sensing data including the coordinate information, the identification information and the state information of the touch input member to the main processor 710 in an operation S133.

The main processor 710 may simultaneously drive the touch driver 430 and the fingerprint sensor driver 440 and receive the touch sensing data from each of the touch driver 430 and the fingerprint sensor driver 440 in an operation S141. Therefore, the main processor 710 may receive the coordinate information, the identification information and the state information of the touch input member from the touch driver 430 and may receive the coordinate information of the user's finger from the fingerprint sensor driver 440.

The main processor 710 may perform a task corresponding to the touch of each of the touch input member and the user's finger in an operation S142. The main processor 710 may execute a task or application indicated by an icon displayed at the touch coordinates of each of the touch input member and the user's finger.

Figure 14:
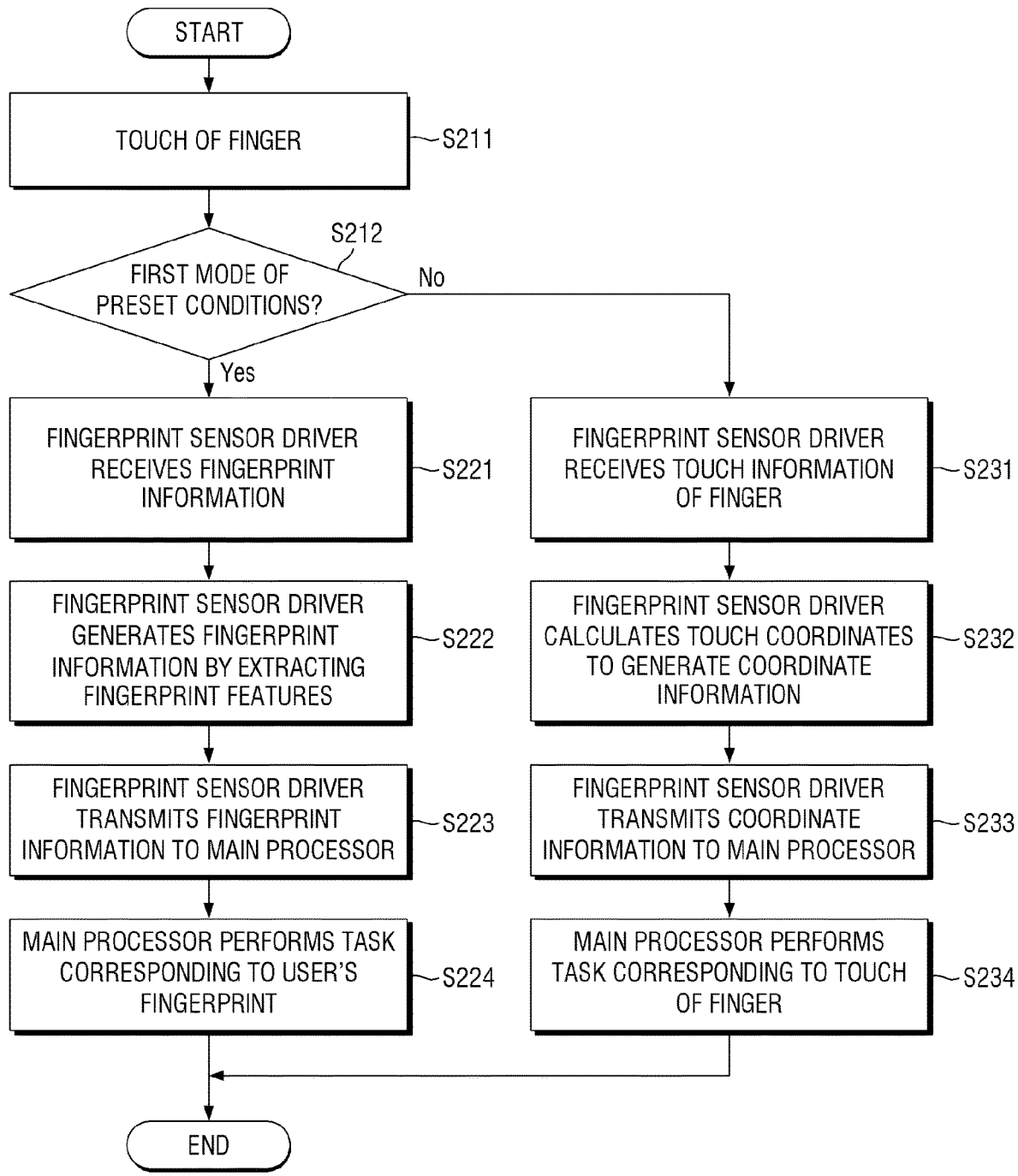
FIG. 14 is a flowchart illustrating another embodiment of a process of driving a fingerprint sensor driver of the display device of FIG. 1 in first and second modes.

FIG. 14 is a flowchart illustrating a process of driving a fingerprint sensor driver of a display device in first and second modes according to an embodiment.

Referring to FIG. 14, a user's finger may touch a surface of a display device 10 or a cover window 100 in an operation S211.

A main processor 710 may determine the first mode or the second mode in an operation S212. The main processor 710 may determine whether an operation step of the display device 10 corresponds to the first mode or the second mode and then provide the determination result to a fingerprint sensor driver 440. Here, the first mode may include at least one of a locking step, an approval step, and a user authenticating step of the display device 10, but example steps of the first mode are not limited thereto. The second mode may correspond to a step other than the first mode.

The fingerprint sensor driver 440 may receive fingerprint information in the first mode in an operation S221. The fingerprint sensor driver 440 may receive a sensing signal including the fingerprint information in the first mode.

The fingerprint sensor driver 440 may extract or generate fingerprint features from the sensing signal and generate fingerprint sensing data including the fingerprint information in an operation S222.

The fingerprint sensor driver 440 may transmit the fingerprint sensing data including the fingerprint information to the main processor 710 in an operation S223.

The main processor 710 may generate a fingerprint image by receiving the fingerprint sensing data and perform a task corresponding to the user's fingerprint in an operation S224.

The fingerprint sensor driver 440 may receive touch information of the finger in the second mode in an operation S231. The fingerprint sensor driver 440 may receive a sensing signal including the touch information of the finger in the second mode.

The fingerprint sensor driver 440 may calculate touch coordinates of the finger based on the sensing signal and generate touch sensing data including the coordinate information in an operation S232.

The fingerprint sensor driver 440 may transmit the touch sensing data including the coordinate information of the user's touch to the main processor 710 in an operation S233.

The main processor 710 may receive the touch sensing data and perform a task corresponding to the touch of the user's finger in an operation S234.

Figure 15:
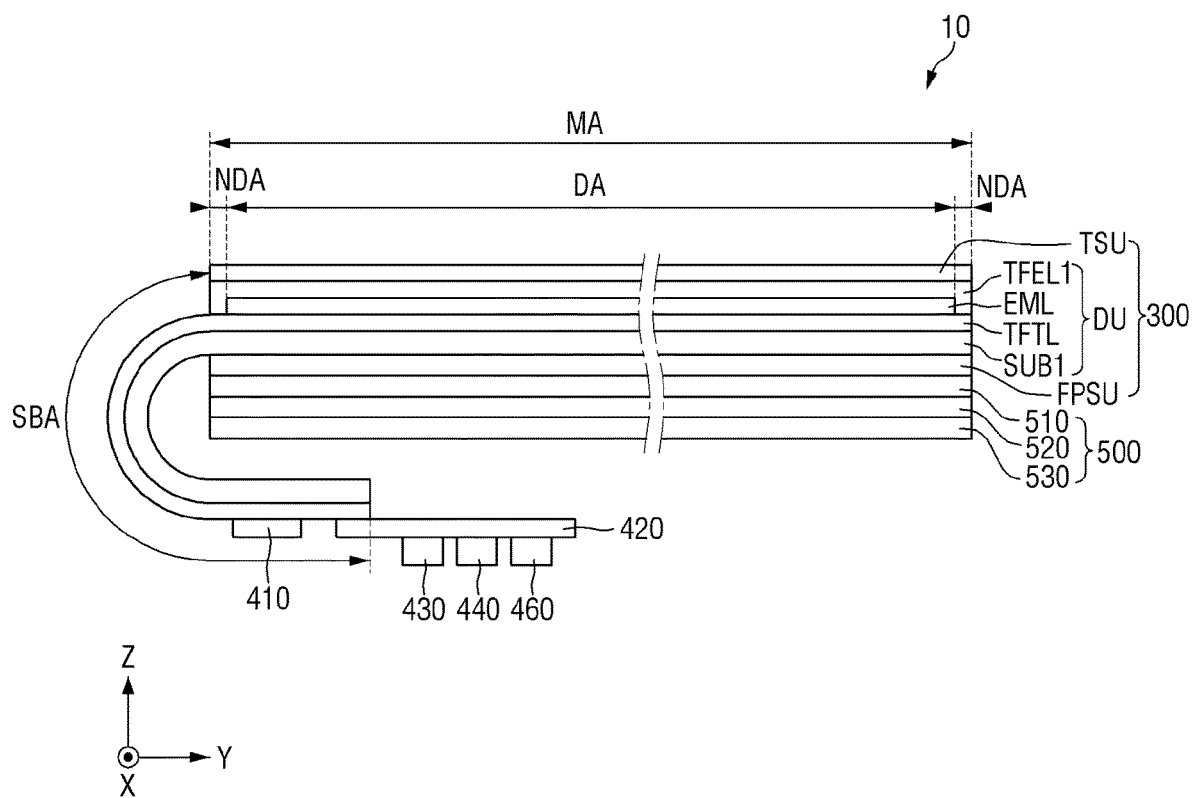
FIG. 15 is a cross-sectional view of another embodiment of the display device of FIG. 1 illustrating a display panel and an electromagnetic sensing unit thereof.

FIG. 15 is a cross-sectional view of a display panel 300 and an electromagnetic sensing unit 500 of a display device 10 according to an embodiment. The display device 10 of FIG. 15 is different from the display device 10 of FIG. 4 in that it further includes the electromagnetic sensing unit 500. Thus, the same elements as those described above will be briefly described or will not be described for descriptive convenience.

Referring to FIG. 15, the display device 10 may include the display panel 300, a display driver 410, a circuit board 420, a touch driver 430, a fingerprint sensor driver 440, an electromagnetic sensor driver 460, and the electromagnetic sensing unit 500.

The display panel 300 may include a display unit DU, a touch sensing unit TSU, and a fingerprint sensing unit FPSU. The display unit DU may include a first substrate SUB1, a thin-film transistor layer TFTL, a light emitting element layer EML, and a first encapsulation layer TFEL1.

The electromagnetic sensor driver 460 may be disposed on the circuit board 420 to drive a plurality of electrode patterns of a digitizer layer 510. The electromagnetic sensor driver 460 may determine the touch coordinates, touch angle and touch pressure of a touch input member such as an electronic pen based on a radio frequency signal received by the electrode patterns. For example, the electromagnetic sensor driver 460 may determine the touch coordinates, touch angle and touch pressure of the touch input member by determining the position, angle and intensity of the radio frequency signal received by the electrode patterns. For example, the electromagnetic sensor driver 460 may be driven in synchronization with at least one of the display driver 410, the touch driver 430 and the fingerprint sensor driver 440, but embodiments are not limited thereto.

The electromagnetic sensing unit 500 may be disposed under the display panel 300. The electromagnetic sensing unit 500 may include the digitizer layer 510, a shielding member 520, and a heat dissipation member 530.

The digitizer layer 510 may be overlapped by a display area DA of the display panel 300 in the thickness direction (e.g., Z-axis direction). The digitizer layer 510 may be attached to the bottom of the display panel 300 by a clear adhesive film (OCA film) or a clear adhesive resin (OCR). The digitizer layer 510 may include a plurality of electrode patterns. The digitizer layer 510 may sense the approach or touch of a touch input member such as a stylus pen that supports electromagnetic resonance (EMR) by using the electrode patterns. Here, the stylus pen may include a coil and may output a radio frequency signal in response to a magnetic field or an electromagnetic signal.

For example, the digitizer layer 510 may generate a magnetic field or an electromagnetic signal on a front surface of the display device 10, and the touch input member may emit a radio frequency signal by sensing the magnetic field or the electromagnetic signal. The digitizer layer 510 may determine the touch coordinates, touch angle and touch pressure of the touch input member by receiving the radio frequency signal generated by the approach or touch of the touch input member.

The shielding member 520 may be disposed under the digitizer layer 510. The shielding member 520 disposed under the digitizer layer 510 may be overlapped by the display area DA in the thickness direction (e.g., Z-axis direction). The shielding member 520 may include magnetic metal powder to guide a magnetic field or an electromagnetic signal passing through the digitizer layer 510 into the shielding member 520. Therefore, the shielding member 520 may reduce emission of the magnetic field or the electromagnetic signal from a lower surface of the shielding member 520.

The heat dissipation member 530 may be disposed under the shielding member 520. The heat dissipation member 530 disposed under the shielding member 520 may be overlapped by the display area DA in the thickness direction (e.g., Z-axis direction). The heat dissipation member 530 may release heat generated by the display device 10 to the outside of the display device 10. For example, the heat dissipation member 530 may include a metal layer having excellent thermal conductivity, such as copper, nickel, ferrite, or silver.

Figure 16:
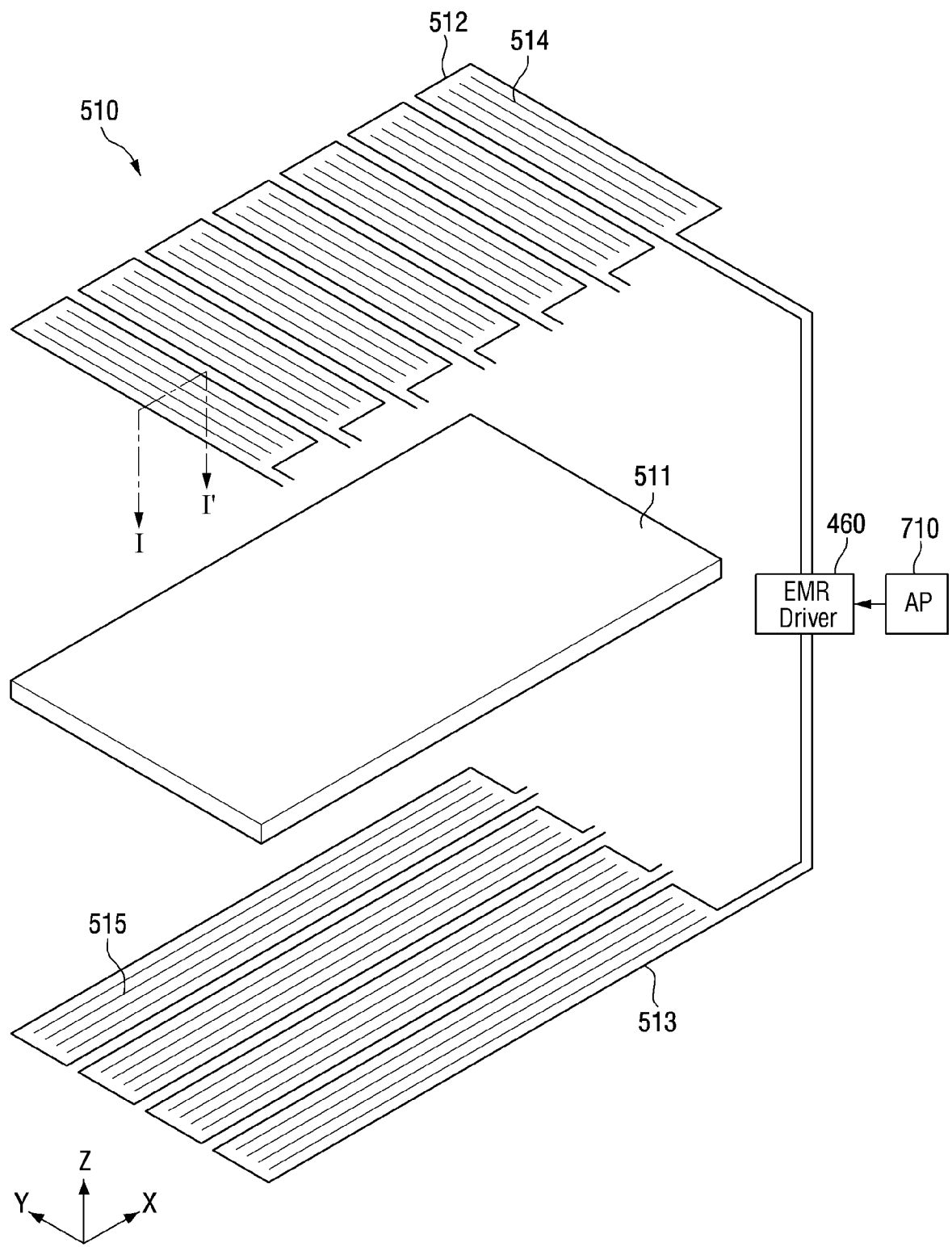
FIG. 16 is an exploded perspective view of a digitizer layer of the display device of FIG. 15.
Figure 17:
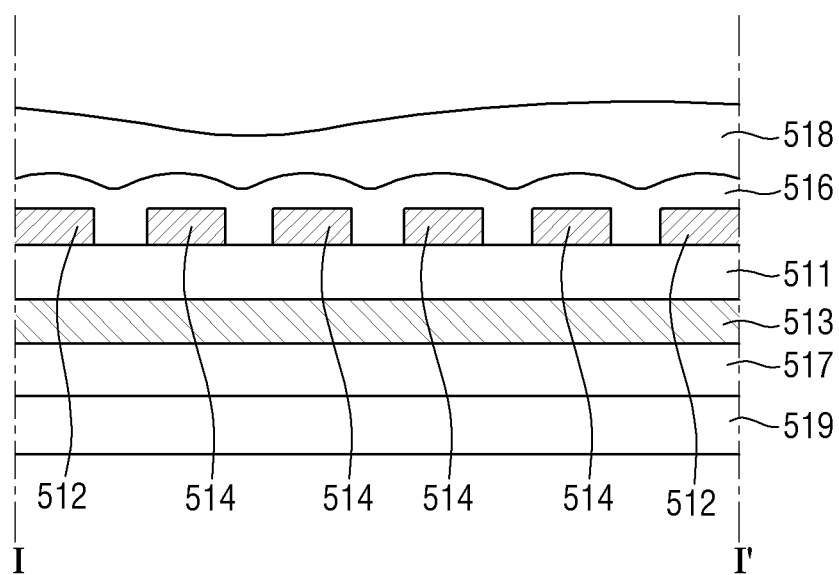
FIG. 17 is a cross-sectional view taken along line I-I' of FIG. 16.

FIG. 16 is an exploded perspective view of the digitizer layer 510 of the display device 10 of FIG. 15. FIG. 17 is a cross-sectional view taken along line I-I' of FIG. 16.

Referring to FIGS. 16 and 17, the digitizer layer 510 includes a base layer 511, first electrode patterns 512, second electrode patterns 513, first dummy patterns 514, second dummy patterns 515, a first adhesive layer 516, a second adhesive layer 517, a first cover layer 518, and a second cover layer 519.

The base layer 511 may have flexibility and include an insulating material. A first surface of the base layer 511 may support the first electrode patterns 512, and a second surface of the base layer 511 may support the second electrode patterns 513. For example, the base layer 511 may include polyimide.

The first electrode patterns 512 and the first dummy patterns 514 may be disposed on the first surface of the base layer 511. Each of the first electrode patterns 512 may extend along the second direction (e.g., Y-axis direction). Each of the first electrode patterns 512 may have a loop shape in plan view, and both ends of each of the first electrode patterns 512 may be connected to the electromagnetic sensor driver 460.

The second electrode patterns 513 and the second dummy patterns 515 may be disposed on the second surface of the base layer 511. Each of the second electrode patterns 513 may extend along the first direction (e.g., X-axis direction). Each of the second electrode patterns 513 may have a loop shape in plan view, and both ends of each of the second electrode patterns 513 may be connected to the electromagnetic sensor driver 460.

The first electrode patterns 512 and the second electrode patterns 513 may intersect each other in plan view. The first and second electrode patterns 512 and 513 may be driven by the electromagnetic sensor driver 460 to generate a magnetic field or an electromagnetic signal. A touch input member such as an electronic pen may emit a radio frequency signal by sensing the magnetic field or the electromagnetic signal, and the first and second electrode patterns 512 and 513 may receive the radio frequency signal emitted from the touch input member. The electromagnetic sensor driver 460 may determine the touch coordinates, touch angle and touch pressure of the touch input member by determining the position, angle and intensity of the radio frequency signal received by the first and second electrode patterns 512 and 513.

For example, each of the first electrode patterns 512 and the second electrode patterns 513 may have a rectangular loop structure in plan view, but the shape of each of the first and second electrode patterns 512 and 513 is not limited thereto.

The first dummy patterns 514 may extend in the second direction (e.g., Y-axis direction) and may be spaced apart from each other in the first direction (e.g., X-axis direction). For example, gaps between the first dummy patterns 514 surrounded by one first electrode pattern 512 may be constant.

The second dummy patterns 515 may extend in the first direction (e.g., X-axis direction) and may be spaced apart from each other in the second direction (e.g., Y-axis direction). For example, gaps between the second dummy patterns 515 surrounded by one second electrode pattern 513 may be constant.

For example, each of the first electrode patterns 512, the first dummy patterns 514, the second electrode patterns 513, and the second dummy patterns 515 may include a metal material such as copper, silver, nickel, or tungsten.

The first adhesive layer 516 may cover the first surface of the base layer 511, the first electrode patterns 512, and the first dummy patterns 514. The first cover layer 518 may be disposed on the first adhesive layer 516. The first cover layer 518 may be attached to the first surface of the base layer 511 by the first adhesive layer 516. The first adhesive layer 516 may be a pressure sensitive adhesive. The first cover layer 518 may have flexibility and include an insulating material. For example, the first cover layer 518 may include polyimide.

The second adhesive layer 517 may cover the second surface of the base layer 511, the second electrode patterns 513, and the second dummy patterns 515. The second cover layer 519 may be disposed under the second adhesive layer 517. The second cover layer 519 may be attached to the second surface of the base layer 511 by the second adhesive layer 517. The second adhesive layer 517 may be a pressure sensitive adhesive. The second cover layer 519 may have flexibility and include an insulating material. For example, the second cover layer 519 may include polyimide.

Figure 18:
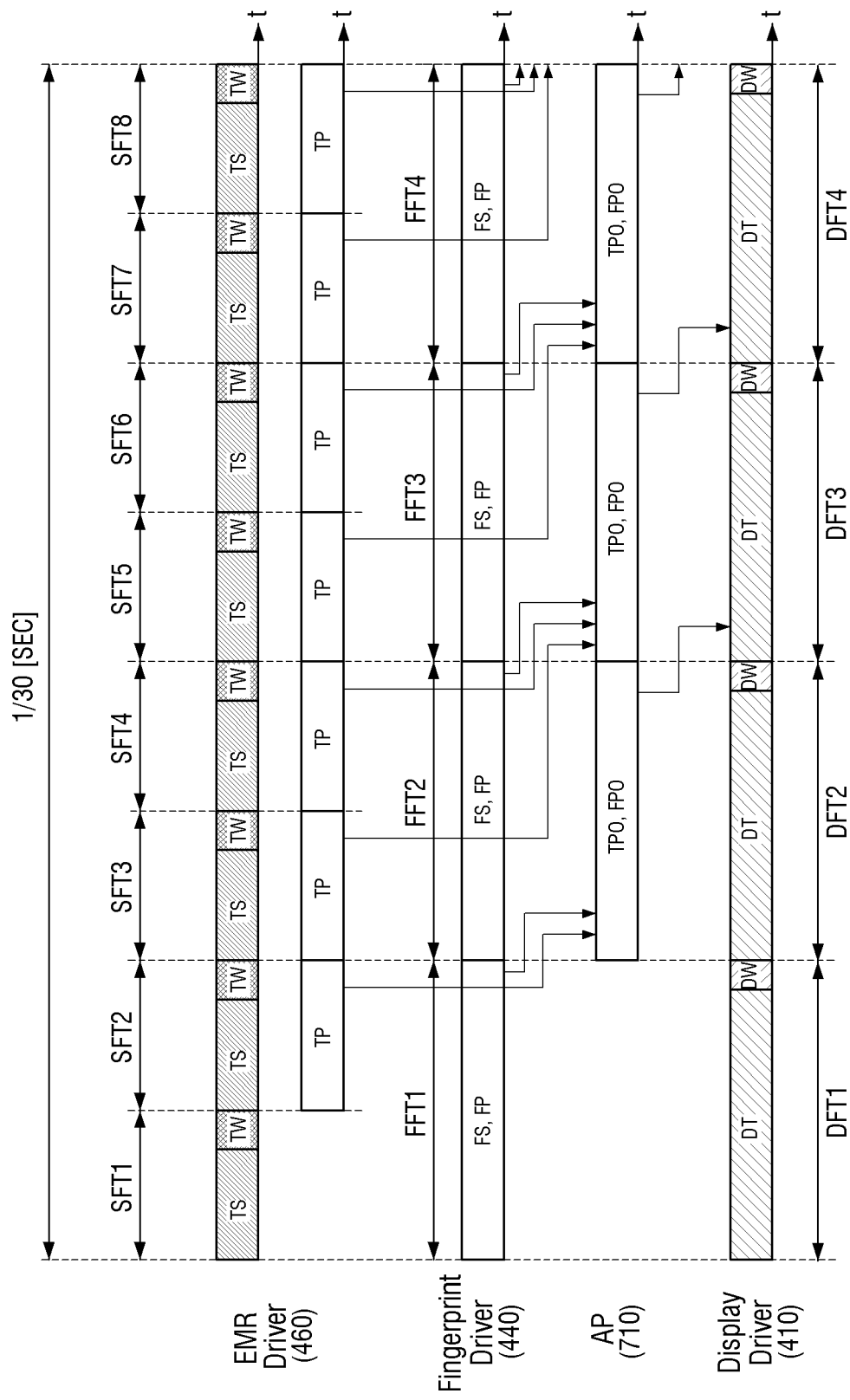
FIG. 18 is a timing diagram illustrating a driving timing of the display device of FIG. 15.

FIG. 18 is a timing diagram illustrating the driving timing of a display device according to an embodiment. Here, the driving timing of the display device of FIG. 18 corresponds to a case where a fingerprint sensor driver 440 is driven in a second mode.

Referring to FIG. 18, a display driver 410, the fingerprint sensor driver 440, and an electromagnetic sensor driver 460 may be driven in synchronization with each other, but embodiments are not limited thereto. The display driver 410 may drive a plurality of pixels SP at a first frequency, the fingerprint sensor driver 440 may drive a plurality of fingerprint sensors FPS at the first frequency or a second frequency different from the first frequency, and the electromagnetic sensor driver 460 may drive first and second electrode patterns 512 and 513 at a third frequency which is an integer multiple of the first frequency or the second frequency. For example, the electromagnetic sensor driver 460 may have a driving frequency of 240 Hz, and the display driver 410 and the fingerprint sensor driver 440 may have a driving frequency of 120 Hz. In this case, first and second touch frame periods SFT1 and SFT2 of the electromagnetic sensor driver 460 may correspond to a first display frame period DFT1 of the display driver 410 and a first fingerprint frame period FFT1 of the fingerprint sensor driver 440.

The display driver 410 may drive the pixels SP during a plurality of display frame periods DFT1 through DFT4 determined by the driving frequency of the display driver 410. For example, the display driver 410 may supply gate signals and data voltages to the pixels SP during the first display frame period DFT1. The display driver 410 may sequentially supply the gate signals to the pixels SP arranged along a plurality of rows during the first display frame period DFT1, and the pixels SP may display images in an order in which the pixels SP are selected by the gate signals.

The electromagnetic sensor driver 460 may drive the first and second electrode patterns 512 and 513 during a plurality of touch frame periods SFT1 through SFT8 determined by the driving frequency of the electromagnetic sensor driver 460. For example, the electromagnetic sensor driver 460 may supply touch driving signals to the first and second electrode patterns 512 and 513 during a touch sensing period TS of the first touch frame period SFT1 to generate a magnetic field or an electromagnetic signal. A touch input member such as an electronic pen may emit a radio frequency signal by sensing the magnetic field or the electromagnetic signal, and the first and second electrode patterns 512 and 513 may receive the radio frequency signal emitted from the touch input member. The electromagnetic sensor driver 460 may receive sensing information of the touch input member through the radio frequency signal received by the first and second electrode patterns 512 and 513.

The electromagnetic sensor driver 460 may stop the supply of the touch driving signals during a touch waiting period TW of the first touch frame period SFT1.

The electromagnetic sensor driver 460 may receive sensing information of the touch input member during the first touch frame period SFT1 and generate touch sensing data during the second touch frame period SFT2 through a process TP of processing the sensing information of the first touch frame period SFT1. Here, the sensing information of the touch input member may include coordinate information, identification information, and state information of the touch input member. For example, the identification information of the touch input member may include a user's ID or personal information, and the state information of the touch input member may include a battery state or an operation state of the touch input member. However, embodiments are not limited thereto. The electromagnetic sensor driver 460 may supply the touch sensing data generated during the second touch frame period SFT2 to a main processor 710.

The electromagnetic sensor driver 460 may receive sensing information of the touch input member during the second touch frame period SFT2 and generate touch sensing data during a third touch frame period SFT3 through a process TP of processing the sensing information of the second touch frame period SFT2. The electromagnetic sensor driver 460 may supply the touch sensing data generated during the third touch frame period SFT3 to the main processor 710.

The fingerprint sensor driver 440 may drive the fingerprint sensors FPS during a plurality of fingerprint frame periods FFT1 through FFT4 determined by the driving frequency of the fingerprint sensor driver 440. For example, the fingerprint sensor driver 440 may supply scan signals to the fingerprint sensors FPS during the first fingerprint frame period FFT1 and may receive sensing signals. The fingerprint sensor driver 440 may sequentially supply the scan signals to the fingerprint sensors FPS arranged along a plurality of rows during the first fingerprint frame period FFT1, and the fingerprint sensors FPS may output the sensing signals in an order in which the fingerprint sensors FPS are selected by the scan signals.

In the second mode, the fingerprint sensor driver 440 may receive sensing information of a user's finger through a sensing process FS and generate touch sensing data through a process FP of processing the sensing information during the first fingerprint frame period FFT1. Here, the sensing information of the finger may include coordinate information of the finger. The fingerprint sensor driver 440 may supply the touch sensing data generated during the first fingerprint frame period FFT1 to the main processor 710.

In the second mode, the fingerprint sensor driver 440 may receive sensing information of the user's finger through a sensing process FS and generate touch sensing data through a process FP of processing the sensing information during a second fingerprint frame period FFT2. The fingerprint sensor driver 440 may supply the fingerprint sensing data generated during the second fingerprint frame period FFT2 to the main processor 710.

In the second mode, the main processor 710 may receive the touch sensing data generated during the second touch frame period SFT2 from the electromagnetic sensor driver 460 and may receive the touch sensing data generated during the first fingerprint frame period FFT1 from the fingerprint sensor driver 440. During the second fingerprint frame period FFT2, the main processor 710 may perform a task corresponding to the sensing information of the touch input member through a process TPO of processing the touch sensing data of the electromagnetic sensor driver 460 and may perform a task corresponding to the sensing information of the finger through a process FPO of processing the touch sensing data of the fingerprint sensor driver 440. For example, the main processor 710 may simultaneously process the touch sensing data of the electromagnetic sensor driver 460 and the touch sensing data of the fingerprint sensor driver 440 during the second fingerprint frame period FFT2. For another example, the main processor 710 may divide the second fingerprint frame period FFT2 to process the touch sensing data of the electromagnetic sensor driver 460 during a part of the second fingerprint frame period FFT2 and process the touch sensing data of the fingerprint sensor driver 440 during the other part of the second fingerprint frame period FFT2. Here, the second fingerprint frame period FFT2 may correspond to a second display frame period DFT2.

In the second mode, the main processor 710 may receive touch sensing data generated during the third and fourth touch frame periods SFT3 and SFT4 from the electromagnetic sensor driver 460 and receive touch sensing data generated during the second fingerprint frame period FFT2 from the fingerprint sensor driver 440. During a third fingerprint frame period FFT3, the main processor 710 may perform a task corresponding to sensing information of the touch input member through a process TPO of processing the touch sensing data of the electromagnetic sensor driver 460 and may perform a task corresponding to sensing information of the finger through a process FPO of processing the touch sensing data of the fingerprint sensor driver 440. Here, the third fingerprint frame period FFT3 may correspond to a third display frame period DFT3.

Therefore, the main processor 710 may simultaneously drive the electromagnetic sensor driver 460 and the fingerprint sensor driver 440 in the second mode and may receive the touch sensing data from each of the electromagnetic sensor driver 460 and the fingerprint sensor driver 440. The main processor 710 may simultaneously process the touch sensing data of the electromagnetic sensor driver 460 and the touch sensing data of the fingerprint sensor driver 440 during one display frame period or one fingerprint frame period. For example, when the touch input member and the user's finger touch a plurality of points on the display device 10, the main processor 710 may simultaneously drive the electromagnetic sensor driver 460 and the fingerprint sensor driver 440 to execute a task or application indicated by an icon displayed at touch coordinates of each of the touch input member and the user's finger. Since the display device 10 simultaneously drives the electromagnetic sensor driver 460 and the fingerprint sensor driver 440 in the second mode, even when the display device 10 is driven at a high-speed driving frequency, the touch input member and the user's finger can be simultaneously recognized or sensed, and the touch sensitivity and touch reliability of the display device 10 can be improved or enhanced.

The display driver 410 may receive information about task performed by the main processor 710 during the second display frame period DFT2 and may display an image corresponding to the information about task during the third display frame period DFT3. The display driver 410 may receive information about task performed by the main processor 710 during the third display frame period DFT3 and may display an image corresponding to the information about task during a fourth display frame period DFT4.

Figure 19:
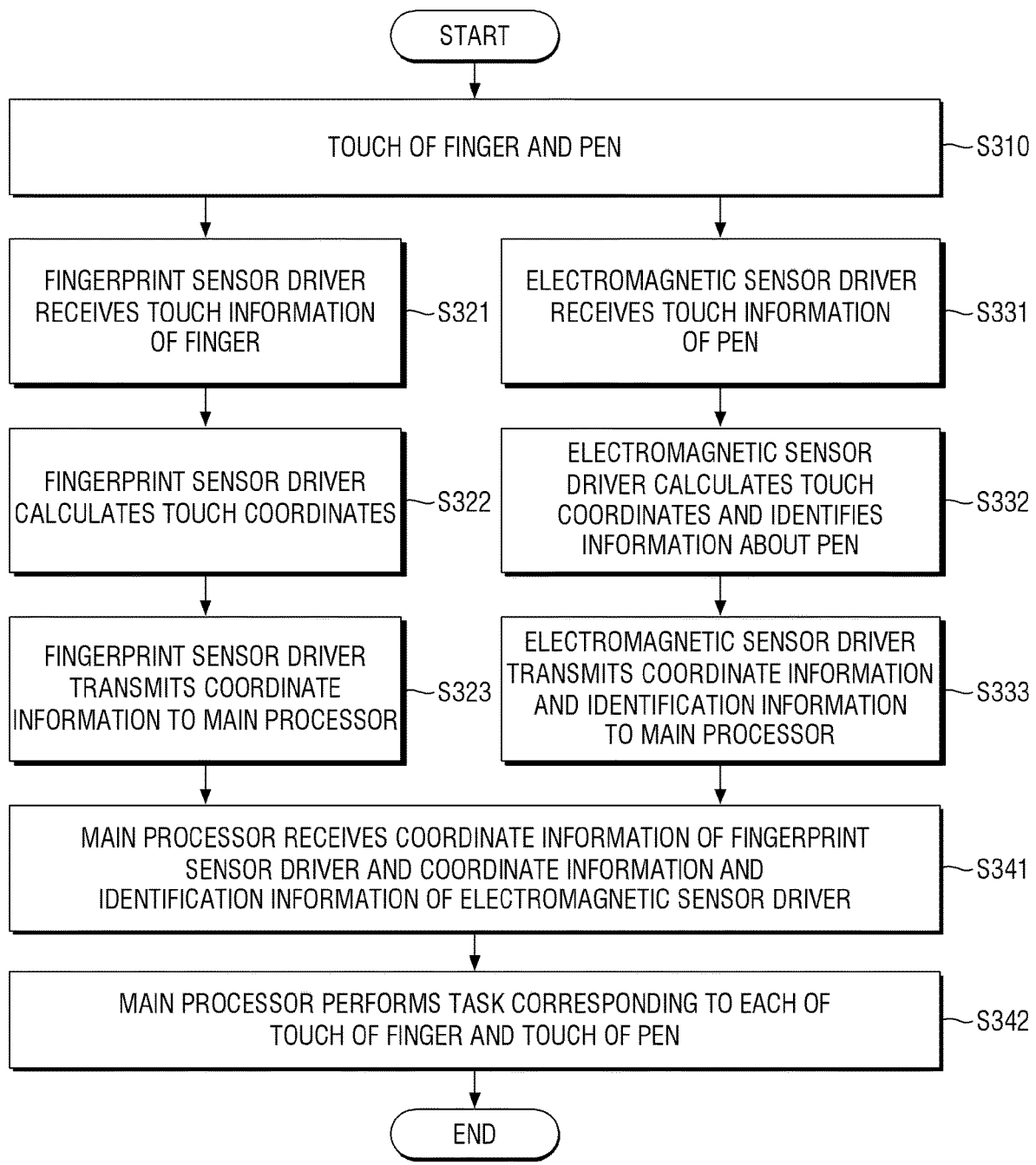
FIG. 19 is a flowchart illustrating an embodiment of a process of driving the display device of FIG. 15.

FIG. 19 is a flowchart illustrating a process of driving a display device according to an embodiment. Here, the process of driving the display device of FIG. 19 corresponds to a case where a fingerprint sensor driver 440 is driven in a second mode.

Referring to FIG. 19, a touch input member and a user's finger may touch a surface of a display device 10 or a cover window 100 in an operation S310.

The fingerprint sensor driver 440 may receive sensing signals from a plurality of fingerprint sensors FPS in the second mode in an operation S321. The sensing signals of the fingerprint sensors FPS may include touch information of the finger.

The fingerprint sensor driver 440 may calculate touch coordinates of the finger based on the sensing signals in an operation S322. The fingerprint sensor driver 440 may generate touch sensing data by calculating the touch coordinates of the finger.

The fingerprint sensor driver 440 may transmit the touch sensing data including coordinate information of the user's touch to a main processor 710 in an operation S323.

An electromagnetic sensor driver 460 may receive sensing signals from first and second electrode patterns 512 and 513 in an operation S331. The sensing signals of the first and second electrode patterns 512 and 513 may include touch information of the touch input member such as a pen.

The electromagnetic sensor driver 460 may calculate touch coordinates of the touch input member based on the sensing signals and identify information about the touch input member in an operation S332. The electromagnetic sensor driver 460 may generate touch sensing data including coordinate information, identification information, and state information of the touch input member.

The electromagnetic sensor driver 460 may transmit the touch sensing data including the coordinate information, the identification information and the state information of the touch input member to the main processor 710 in an operation S333.

The main processor 710 may simultaneously drive the electromagnetic sensor driver 460 and the fingerprint sensor driver 440 and receive the touch sensing data from each of the electromagnetic sensor driver 460 and the fingerprint sensor driver 440 in an operation S341. Therefore, the main processor 710 may receive the coordinate information, the identification information and the state information of the touch input member from the electromagnetic sensor driver 460 and may receive the coordinate information of the user's finger from the fingerprint sensor driver 440.

The main processor 710 may perform a task corresponding to the touch of each of the touch input member and the user's finger in an operation S342. The main processor 710 may execute a task or application indicated by an icon displayed at the touch coordinates of each of the touch input member and the user's finger.

In a display device according to embodiments, a main processor may simultaneously drive a touch driver and a fingerprint sensor driver. The main processor may simultaneously process touch sensing data of the touch driver and touch sensing data of the fingerprint sensor driver during one display frame period and may execute a task or application indicated by an icon displayed at touch coordinates of each of a touch input member and a user's finger. Therefore, since the display device simultaneously drives the touch driver and the fingerprint sensor driver, even when the display device is driven at a high-speed driving frequency, the touch input member and the user's finger can be simultaneously recognized or sensed, and the touch sensitivity and touch reliability of the display device can be improved or enhanced.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
   a display unit comprising a plurality of pixels;
   a touch sensing unit disposed on the display unit and comprising a plurality of touch electrodes;
   a fingerprint sensing unit disposed below the display unit and overlapping the touch sensing unit, and comprising a plurality of fingerprint sensors;
   a touch driver configured to drive the touch sensing unit to sense a touch of a touch input member;
   a fingerprint sensor driver configured to drive the fingerprint sensors to sense a fingerprint of a user in a first mode and configured to drive the fingerprint sensing unit in synchronization with the touch driver to sense a touch of the user in a second mode;
   a main processor configured to perform a task based on sensing information of the fingerprint of the user received from the fingerprint sensor driver in the first mode and configured to simultaneously control the fingerprint sensor driver and the touch driver to perform a task based on sensing information of the touch input member received from the touch driver and sensing information of the touch of the user received from the fingerprint sensor driver in the second mode, wherein a touch input member and a user's finger may be simultaneously recognized; and
   a display driver configured to drive the plurality of pixels based on information of the task performed by the main processor to display an image corresponding to the information of the task performed by the main processor, wherein:
   the sensing information of the touch input member comprises coordinate information and identification information of the touch input member,
   the sensing information of the touch of the user comprises coordinate information of the touch of the user, and
   in the second mode, the main processor is configured to receive touch sensing data generated during a first fingerprint frame period of the fingerprint sensor driver to perform a task corresponding to the sensing information of the touch input member received from the touch driver and a task corresponding to the sensing information of the touch of the user received from the fingerprint sensor driver during a second fingerprint frame period immediately after the first fingerprint frame period.

2. The display device of claim 1, wherein in the second mode, the main processor is configured to perform a task corresponding to the sensing information of the touch input member received from the touch driver and a task corresponding to the sensing information of the touch of the user received from the fingerprint sensor driver during one display frame period of the display driver.

3. The display device of claim 1, wherein:
   the display driver is configured to drive the plurality of pixels at a first frequency,
   the fingerprint sensor driver is configured to drive the fingerprint sensors at the first frequency or a second frequency different from the first frequency, and
   the touch driver is configured to drive the touch electrodes at a third frequency different from the first frequency and the second frequency.

4. The display device of claim 3, wherein the third frequency is an integer multiple of the second frequency.

5. The display device of claim 1, wherein the touch driver is configured to drive the touch electrodes to receive the sensing information of the touch input member during a first touch frame period and to generate touch sensing data comprising the coordinate information and the identification information of the touch input member based on the sensing information of the touch input member during the first touch frame period during a second touch frame period immediately after the first touch frame period.

6. The display device of claim 5, wherein the touch driver is configured to drive the touch electrodes to receive the sensing information of the touch input member during the second touch frame period and to generate touch sensing data comprising the coordinate information and the identification information of the touch input member based on the sensing information of the touch input member during the second touch frame period during a third touch frame period immediately after the second touch frame period.

7. The display device of claim 6, wherein in the second mode, the fingerprint sensor driver is configured to receive the sensing information of the touch of the user during a first fingerprint frame period corresponding to at least one touch frame period and to generate touch sensing data comprising the coordinate information of the touch of the user based on the sensing information of the touch of the user.

8. The display device of claim 1, wherein the display driver is configured to display an image corresponding to information of a task performed by the main processor during a display frame period immediately after the second fingerprint frame period.

9. The display device of claim 1, wherein in the second mode, the main processor is configured to receive touch sensing data generated during the second fingerprint frame period of the fingerprint sensor driver to perform a task corresponding to the sensing information of the touch input member received from the touch driver and a task corresponding to the sensing information of the touch of the user received from the fingerprint sensor driver during a third fingerprint frame period immediately after the second fingerprint frame period.

10. The display device of claim 9, wherein the display driver is configured to displays an image corresponding to information of a task performed by the main processor during a display frame period immediately after the third fingerprint frame period.

11. The display device of claim 1, wherein the touch driver is configured to perform bi-directional communication with the touch input member to receive identification information or state information of the touch input member.

12. The display device of claim 1, wherein the fingerprint sensor driver is configured to operate according to the first mode in a preset step comprising at least one of a
   locking step, an approval step and a user authentication step and operates according to the second mode in a step other than the first mode.

13. The display device of claim 1, wherein the fingerprint sensors comprise at least one of an optical fingerprint sensor, an ultrasonic fingerprint sensor, and a capacitive fingerprint sensor.

14. A display device comprising:
   a display unit comprising a plurality of pixels;
   a touch sensing unit disposed on the display unit and comprising a plurality of touch electrodes;

a fingerprint sensing unit disposed below the display unit and overlapping the touch sensing unit, and comprising a plurality of fingerprint sensors;

a touch driver configured to drive the touch sensing unit to sense a touch of a touch input member;

a fingerprint sensor driver configured to drive the fingerprint sensing unit in synchronization with the touch driver to sense a touch of a user;

a main processor configured to simultaneously control the touch driver and the fingerprint sensor driver and to perform a task based on sensing information of the touch input member received from the touch driver and sensing information of the touch of the user received from the fingerprint sensor driver, wherein a touch input member and a user's finger may be simultaneously recognized; and a display driver configured to drive the plurality of pixels based on information of the task performed by the main processor to display an image corresponding to the information of the task performed by the main processor, wherein the main processor is configured to receive touch sensing data generated during a first fingerprint frame period of the fingerprint sensor driver to perform a task corresponding to the sensing information of the touch input member received from the touch driver and a task corresponding to the sensing information of the touch of the user received from the fingerprint sensor driver during a second fingerprint frame period immediately after the first fingerprint frame period.

15. The display device of claim 14, wherein the main processor is configured to perform a task corresponding to the sensing information of the touch input member received from the touch driver and a task corresponding to the sensing information of the touch of the user received from the fingerprint sensor driver during one display frame period of the display driver, and wherein:

the sensing Information of the touch input member comprises coordinate information and identification information of the touch input member, and the sensing information of the touch of the user comprises coordinate information of the touch of the user.

16. The display device of claim 14, wherein the main processor is configured to receive the sensing information of the touch of the user sensed during a first fingerprint frame period of the fingerprint sensor driver and the sensing information of the touch input member sensed during at least one consecutive touch frame period of the touch driver to perform a task corresponding to the sensing information of the touch input member received from the touch driver and a task corresponding to the sensing information of the touch of the user received from the fingerprint sensor driver during a second fingerprint frame period immediately after the first fingerprint frame period, and wherein:

the sensing information of the touch input member comprises coordinate information and identification information of the touch input member, and the sensing information of the touch of the user comprises coordinate information of the touch of the user.

17. The display device of claim 16, wherein the display driver is configured to display an image corresponding to information of a task performed by the main processor during a display frame period immediately after the second fingerprint frame period.

18. The display device of claim 16, wherein the main processor is configured to receive the coordinate information of the touch of the user sensed during the second fingerprint frame period of the fingerprint sensor driver to perform a task corresponding to the sensing information of the of the touch input member received from the touch driver and a task corresponding to the sensing information of the touch of the user received from the fingerprint sensor driver during a third fingerprint frame period immediately after the second fingerprint frame period.

19. The display device of claim 18, wherein the display driver is configured to display an image corresponding to information of the task performed by the main processor during a display frame period immediately after the third fingerprint frame period.

20. The display device of claim 1, further comprising a connector disposed between the main processor and each of the fingerprint sensor driver and the touch driver to electrically connect the main processor to the fingerprint sensor driver and the touch driver.

21. The display device of claim 20, wherein the connector comprises a portion of a circuit board upon which the main processor is mounted and which is connected to a cable in electrical communication with of the fingerprint sensor driver and the touch driver.

* * * * *